(12) United States Patent
Izumi et al.

(10) Patent No.: US 6,254,763 B1
(45) Date of Patent: Jul. 3, 2001

(54) METHOD FOR MANUFACTURING HIGH CONCENTRATION OZONE GAS

(75) Inventors: Jun Izumi; Akinori Yasutake; Nariyuki Tomonaga; Hiroyuki Tsutaya, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/283,461

(22) Filed: Apr. 1, 1999

(30) Foreign Application Priority Data

Apr. 2, 1998 (JP) .................................................. 10-90141
Apr. 3, 1998 (JP) .................................................. 10-91813

(51) Int. Cl.⁷ ....................................................... C25C 1/00
(52) U.S. Cl. ................ 205/626; 422/186.07; 422/186.11
(58) Field of Search ...................... 205/626; 422/186.07, 422/186.08, 186.11, 186.12

(56) References Cited

U.S. PATENT DOCUMENTS 4,462,965 * 7/1984 Azuma et al. ................... 422/186.08
5,290,406 * 3/1994 Sawamoto et al. ................... 205/626
5,846,298 * 12/1998 Weist, Jr. ................................. 95/138

FOREIGN PATENT DOCUMENTS 0 792 835 A1    9/1997  (EP) .

\* cited by examiner

Primary Examiner—Kathryn Gorgos
Assistant Examiner—Wesley A. Nicolas
(74) Attorney, Agent, or Firm—Anderson, Kill & Olick P.C.

(57) ABSTRACT

A method for manufacturing high concentration ozone gas, characterized by employing a pressure swing adsorbing apparatus having a plurality of adsorbing layers filled with ozone adsorbent, in which the ozone adsorbent is one or two or more kinds of adsorbent selected from the group consisting of high silica pentasyl zeolite, dealuminized fogersite, and mesoporous silicate. A method for manufacturing high concentration ozone gas, characterized by employing a TSA adsorbing system, and recovering the concentrated ozone gas continuously, in which the ozone adsorbent is one or two or more kinds of above adsorbent, and the gas containing ozone from the ozone generating apparatus is cooled by the oxygen concentrated gas at a relatively low temperature flowing out from the adsorbing layers in the adsorbing process.

29 Claims, 15 Drawing Sheets

METHOD FOR MANUFACTURING HIGH CONCENTRATION OZONE GAS

BACKGROUND OF THE INVENTION

The present invention relates to a manufacturing method of high concentration ozone gas and an apparatus thereof using a pressure swing adsorption apparatus (PSA apparatus) having plural adsorbing layers filled with a specific high silica ozone adsorbent large in the difference of ozone adsorbing amount between adsorption pressure and desorption pressure, that is, the ozone adsorbing capability.

The invention also relates to a manufacturing method of high concentration ozone gas and an apparatus thereof for concentrating ozone by a temperature swing adsorption system for changing over an ozone adsorbing process at a relatively low temperature and an ozone recovery process at a relatively high temperature, by using a specific ozone adsorbent having a high ozone adsorbing capability even in the presence of water.

Ozone is produced by using silent discharge apparatus or water electrolytic apparatus, but the ozone gas obtained from these apparatuses are low in concentration, and it is usually used after concentrating by an ozone adsorbing apparatus or the like.

As an ozone concentrating apparatus, an oxygen recycling ozone generating apparatus using liquid oxygen is proposed (Japanese Patent Application Laid-open No. 53-64690). A schematic diagram of this apparatus is shown in FIG. 15. It is a feature of this apparatus that liquid oxygen is used as the oxygen material. This liquid oxygen 31 is fed into an ozone generating apparatus 32, and the gas containing the ozone is cooled to about −60° C. by a heat exchanger 33 and a refrigerating machine 34, it is further fed into an ozone adsorbing tower 35 filled with silica gel to adsorb ozone, the gas containing oxygen flowing out from the adsorbing tower 35 is fed into the heat exchanger 33 to cool the gas containing the ozone, and it is returned to the material side of the ozone generating apparatus 32. On the other hand, the adsorbing tower 35 having adsorbed the ozone is transferred to the desorbing process, and the air 37 dried by a dryer 36 is heated by a heat exchanger 38, and is fed into the ozone adsorbing tower 35 to be heated, purged and desorbed, and a concentrated ozone gas 37 is recovered, while the desorbed concentrated ozone gas 39 is fed into the heat exchanger 38, and the dried air is heated. Consequently, the regenerated adsorbing tower 35 by desorbing the ozone is transferred from the desorbing process to the adsorbing process.

Thus, the silica gel is known as ozone adsorbent, but since it is extremely large in the moisture adsorbing capability as compared with ozone, if moisture is present in the gas contacting with the adsorbent (the gas to be treated, purge gas, and the like), the moisture is preferentially adsorbed by the silica gel, and it is hard to desorb the once adsorbed moisture, and the moisture is accumulated, and hence it is difficult to maintain a specific ozone adsorbing capability. As a result, an extremely large amount of silica gel is needed for maintaining a specific gas treating capacity, and the adsorbing apparatus itself is increased in its size. Besides, when adsorption and desorption of moisture are repeated, the silica gel is powdered and may be lowered in the adsorbing capability.

In the aforesaid apparatus, using liquid oxygen as oxygen material, by preliminarily drying the purge gas and feeding into the adsorbing tower, moisture is prevented from mixing into the adsorbing tower filled with silica gel, and the ozone adsorbing amount is increased by utilizing the low temperature of the liquid oxygen.

Generally, the ozone adsorbing amount is larger as the temperature is lower, but it is hard to cool lower than −60° C. unless a particular refrigerating machine is used, and a large amount of adsorbent is usually required for increasing the treated gas amount, and the apparatus becomes larger in size, which causes to increase the manufacturing cost and running cost of the apparatus.

SUMMARY OF THE INVENTION

It is hence an object of the invention to solve the above problems, and provide a method and apparatus for manufacturing high concentration ozone gas capable of concentrating ozone efficiently, by using a specific high silica ozone adsorbent excellent in ozone adsorbing capability even in the presence of moisture, and applying this adsorbent in a pressure swing adsorbing apparatus or a temperature swing adsorbing apparatus. Moreover, by combining a specific ozone generating apparatus and the pressure swing adsorbing apparatus or temperature swing adsorbing apparatus, it is also intended to provide a method and apparatus for manufacturing high concentration ozone further excellent in the ozone concentrating efficiency.

Invention of First Group

The invention of a first group succeeded in solving the above problems by employing the following constitution.

(1) A manufacturing method of high concentration ozone gas, characterized by employing a pressure swing adsorbing apparatus having a plurality of adsorbing layers filled with ozone adsorbent, adsorbing ozone by feeding gas containing ozone at a relatively high pressure into the adsorbing layers in the adsorbing process, and recovering concentrated ozone gas by setting the adsorbing layers of the desorbing process to a relatively low pressure, in which the ozone adsorbent is an adsorbent selected from the group consisting of high silica pentasyl zeolite, dealuminized fogersite, and mesoporous silicate.

(2) A manufacturing method of high concentration ozone gas according to (1), in which the high silica pentasyl zeolite has the $SiO_2/Al_2O_3$ ratio of 70 or more, preferably 100 or more, dealuminized fogersite has the $SiO_2/Al_2O_3$ ratio of 20 or more, preferably 50 or more, and mesoporous silicate has the $SiO_2/Al_2O_3$ ratio of 20 or more, preferably 50 or more.

(3) A manufacturing method of high concentration ozone gas according to (1) or (2), in which the adsorbing layers in the adsorbing process are held at temperature of −60° C. to 25° C.

(4) A manufacturing method of high concentration ozone gas according to any one of (1) to (3), in which the adsorbing pressure in the adsorbing process is selected in a range of 1.05 to 5 atm, and the desorbing pressure of the desorbing process is selected in a range of 0.04 to 0.3 atm.

(5) A manufacturing method of high concentration ozone gas according to any one of (1) to (4), in which the changeover time of the pressure swing adsorbing apparatus is selected in a range of 1 to 10 minutes.

(6) A manufacturing method of high concentration ozone gas according to any one of (1) to (5), in which part of the high pressure oxygen concentrated gas flowing out from the adsorbing layers in the adsorbing process is decompressed by a reducing valve, and is fed into the adsorbing layers in the desorbing process to be purged.

(7) A manufacturing method of high concentration ozone gas according to (6), in which the purge rate in the purge operation is selected in a range of 1 to 2.

(8) A manufacturing method of high concentration ozone gas according to any one of (1) to (7), in which ozone is generated by using a water electrolytic ozone generating apparatus of high pressure, the gas containing ozone is fed into the adsorbing layers in the adsorbing process of the pressure swing adsorbing apparatus, and part of the high pressure oxygen concentrated gas flowing out from the adsorbing layers in the adsorbing process is returned to the hydrogen electrode chamber of the water electrolytic ozone generating apparatus to depolarize the oxygen.

(9) A manufacturing method of high concentration ozone gas according to any one of (1) to (7), in which ozone is generated by using a silent discharge ozone generating apparatus of high pressure specification, the gas containing ozone is fed into the adsorbing layers in the adsorbing process of the pressure swing adsorbing apparatus, and part of the high pressure oxygen concentrated gas flowing out from the adsorbing layers in the adsorbing process is returned to the material side of the silent discharge ozone generating apparatus.

(10) A manufacturing apparatus of high concentration ozone gas, comprising an ozone generating apparatus, and a pressure swing adsorbing apparatus having plural adsorbing layers filled with ozone adsorbent, in which the ozone generating apparatus is a water electrolytic ozone generating apparatus of high pressure, the ozone adsorbent is one or two or more kinds of adsorbent selected from the group consisting of high silica pentasyl zeolite, dealuminized fogersite, and mesoporous silicate, a compressor and a changeover valve are attached to a lead pipe for feeding gas containing ozone for connecting the ozone generating apparatus to the adsorbing layers in an adsorbing process, a lead pipe for circulating oxygen concentrated gas flowing out from the adsorbing layers is connected to a hydrogen electrode chamber of the water electrolytic ozone generating apparatus through the changeover valve so as to depolarize the oxygen, a lead pipe for feeding purge gas branched off the lead pipe for circulating oxygen concentrated gas is connected to the adsorbing layers in a desorbing process through a reducing valve and changeover valve, and a control device is provided for changing over all the changeover valves to set the adsorbing layers alternately in the adsorbing process and desorbing process by connecting a lead pipe for recovering ozone to the adsorbing layers in the desorbing process through a changeover valve to recover high concentration ozone gas.

(11) A manufacturing apparatus of high concentration ozone gas, comprising an ozone generating apparatus, and a pressure swing adsorbing apparatus having plural adsorbing layers filled with ozone adsorbent, in which the ozone generating apparatus is a silent discharge ozone generating apparatus of high pressure, the ozone adsorbent is one or two or more kinds of adsorbent selected from the group consisting of high silica pentasyl zeolite, dealuminized fogersite, and mesoporous silicate, a compressor and a changeover valve are attached to a lead pipe for feeding gas containing ozone for connecting the ozone generating apparatus to the adsorbing layers in an adsorbing process, a lead pipe for circulating oxygen concentrated gas at a relatively high pressure flowing out from the adsorbing layers is connected to a lead pipe for feeding oxygen material of the silent discharge ozone generating apparatus, a lead pipe for feeding purge gas branched off the lead pipe for circulating oxygen concentrated gas is connected to the adsorbing layers in a desorbing process through a reducing valve and changeover valve, and a control device is provided for changing over all the changeover valves to set the adsorbing layers alternately in the adsorbing process and desorbing process by connecting a lead pipe for recovering ozone to the adsorbing layers in the desorbing process through a changeover valve to recover high concentration ozone gas.

In this constitution, the invention of the first group can efficiently concentrate the ozone even in the presence of moisture, and thereby the manufacturing apparatus of high concentration ozone gas is reduced in size, and the manufacturing cost and running cost of the apparatus are substantially reduced. Moreover, when combined with the silent discharge ozone generating apparatus of high pressure or water electrolytic ozone generating apparatus of high pressure, matching with the pressure swing adsorbing apparatus is enhanced, and moreover by feeding the concentrated oxygen gas in the adsorbing process into the hydrogen electrode of the water electrolytic ozone generating apparatus, the oxygen depolarizing action is promoted, and the power to be applied can be decreased.

Invention of Second Group

The invention of a second group succeeded in solving the above problems by employing the following constitution.

(12) A manufacturing method of high concentration ozone gas, using two or more adsorbing layers filled with ozone adsorbent, employing a temperature swing adsorbing system for transferring the adsorbing layers from an adsorbing process at a relatively low temperature to a desorbing process at a relatively high temperature, and further returning to the adsorbing process, precooling the gas containing ozone from an ozone generating apparatus and feeding into the adsorbing layers in the adsorbing process, discharging oxygen concentrated gas at a relatively low temperature from the adsorbing layers, passing purge gas at a relatively high temperature into the adsorbing layers in the desorbing process in an opposite direction of the gas flow in the adsorbing process, and recovering the concentrated ozone gas continuously, in which the ozone adsorbent is one or two or more kinds of adsorbent selected from the group consisting of high silica pentasyl zeolite, dealuminized fogersite, and mesoporous silicate, and the gas containing ozone from the ozone generating apparatus is cooled by the oxygen concentrated gas at a relatively low temperature flowing out from the adsorbing layers in the adsorbing process.

(13) A manufacturing method of high concentration ozone gas according to (12), in which the high silica pentasyl zeolite has the $SiO_2/Al_2O_3$ ratio of 70 or more, dealuminized fogersite has the $SiO_2/Al_2O_3$ ratio of 20 or more, and mesoporous silicate has the $SiO_2/Al_2O_3$ ratio of 20 or more,.

(14) A manufacturing method of high concentration ozone gas according to (12) or (13), using three or more adsorbing layers and employing a temperature swing adsorbing system for transferring the adsorbing layers from an adsorbing process at a relatively low temperature to a desorbing process at a relatively high temperature, and further returning to the adsorbing process through a cooling process, in which part of oxygen concentrated gas at a relatively low temperature flowing out from the adsorbing process is fed into the adsorbing layers in the cooling process and is cooled.

(15) A manufacturing method of high concentration ozone gas according to any one of (12) to (14), in which part of oxygen concentrated gas at a relatively low temperature flowing out from the adsorbing process is heated to purge temperature, and is passed into the adsorbing layers in the desorbing process in an opposite direction of the gas flow in the adsorbing process, and the ozone is heated, purged and desorbed.

(16) A manufacturing method of high concentration ozone gas according to any one of (12) to (15), in which purge gas suited to the purpose of use of the high concentration ozone gas is heated to purge temperature, and is passed into the adsorbing layers in the desorbing process in an opposite direction of the gas flow in the adsorbing process, and the ozone is heated, purged and desorbed.

(17) A manufacturing method of high concentration ozone gas according to any one of (12) to (16), in which the purge rate in the purge operation is selected in a range of 1 to 2.

(18) A manufacturing method of high concentration ozone gas according to any one of (12) to (17), in which the adsorbing temperature of the adsorbing process is selected in a range of −100° C. to −30° C., preferably in a range of −60° C. to −30° C., and the desorbing temperature of the desorbing process is selected in a range of 0° C. to 50° C.

(19) A manufacturing method of high concentration ozone gas according to any one of (12) to (18), in which the adsorbing pressure of the adsorbing process is selected in a range of 1 to 4 atm.

(20) A manufacturing method of high concentration ozone gas according to any one of (12) to (19), in which the changeover time of the temperature swing adsorbing system is selected in a range of 10 to 60 minutes.

(21) A manufacturing method of high concentration ozone gas according to any one of (12) to (20), using a water electrolytic ozone generating apparatus as the ozone generating apparatus, in which part of the oxygen concentrated gas flowing out from the adsorbing layers in the adsorbing process is returned to the hydrogen electrode chamber of the water electrolytic ozone generating apparatus to depolarize the oxygen.

(22) A manufacturing method of high concentration ozone gas according to any one of (12) to (20), using a silent discharge ozone generating apparatus as the ozone generating apparatus, in which part of the oxygen concentrated gas flowing out from the adsorbing layers in the adsorbing process is returned to the oxygen material side of the silent discharge ozone generating apparatus.

(23) A manufacturing apparatus of high concentration ozone gas, comprising an ozone generating apparatus, and a temperature swing adsorbing apparatus having plural adsorbing layers filled with ozone adsorbent, in which the ozone generating apparatus is a water electrolytic ozone generating apparatus, the ozone adsorbent is one or two or more kinds of adsorbent selected from the group consisting of high silica pentasyl zeolite, dealuminized fogersite, and mesoporous silicate, a heat exchanger, a cooler and a changeover valve are attached to a lead pipe for feeding gas containing ozone for connecting the ozone generating apparatus to the adsorbing layers in an adsorbing process, a lead pipe for circulating oxygen concentrated gas at a relatively low temperature flowing out from the adsorbing layers is connected to the heat exchanger through the changeover valve, the gas containing ozone is precooled by the oxygen concentrated gas at relatively low temperature in the heat exchanger, the outlet side of the oxygen concentrated gas at a relatively low temperature of the heat exchanger is connected to a hydrogen electrode chamber of the water electrolytic ozone generating apparatus through a lead pipe, the oxygen concentrated gas at a relatively low temperature is supplied into the hydrogen electrode chamber to encourage the oxygen depolarization action, a lead pipe for feeding purge gas is branched off from the lead pipe for circulating the oxygen concentrated gas at a relatively low temperature, and is connected to the adsorbing layers in a desorbing process, a heater and a changeover valve are attached to the lead pipe for feeding purge gas to supply the oxygen concentrated gas at a relatively low temperature to the adsorbing layers as heating purge gas, the other end of the adsorbing layers in the desorbing process is connected to a lead pipe for recovering high concentration ozone gas through the changeover valve, and all the changeover vales are changed over simultaneously to use the adsorbing layers alternately in the adsorbing process and desorbing process.

(24) A manufacturing apparatus of high concentration ozone gas, comprising an ozone generating apparatus, and a merry-go-round type temperature swing adsorbing apparatus having three or more adsorbing layers filled with ozone adsorbent, in which the ozone generating apparatus is a water electrolytic ozone generating apparatus, the ozone adsorbent is one or two or more kinds of adsorbent selected from the group consisting of high silica pentasyl zeolite, dealuminized fogersite, and mesoporous silicate, a lead pipe for feeding gas containing ozone from the ozone generating apparatus and a lead pipe for circulating oxygen concentrated gas can be connected before and after the adsorbing layers in an adsorbing process, a lead pipe for feeding heating purge gas and a lead pipe for recovering high concentration ozone gas can be connected before and after the adsorbing layers in a desorbing process, a lead pipe for feeding cooling gas branched off from the lead pipe for circulating the oxygen concentrated gas and a lead pipe for recovery of the cooling gas can be connected before and after the adsorbing layers in a cooling process, the adsorbing process, desorbing process and cooling process are transferred sequentially by rotating the merry-go-round composed of the adsorbing layers, a heat exchanger and a cooler are attached to the lead pipe for feeding gas containing oxygen, the lead pipe for circulating oxygen concentrated gas is connected to the heat exchanger, the gas containing ozone is precooled by the oxygen concentrated gas at relatively low temperature flowing out from the adsorbing layers in the adsorbing process, the outlet side of the oxygen concentrated gas at a relatively low temperature of the heat exchanger is connected to a hydrogen electrode chamber of the water electrolytic ozone generating apparatus through a lead pipe, and the oxygen concentrated gas at a relatively low temperature is supplied into the hydrogen electrode chamber to encourage the oxygen depolarization action.

(25) A manufacturing apparatus of high concentration ozone gas, comprising an ozone generating apparatus, and a temperature swing adsorbing apparatus having plural adsorbing layers filled with ozone adsorbent, in which the ozone generating apparatus is a silent discharge ozone generating apparatus, the ozone adsorbent is one or two or more kinds of adsorbent selected from the group consisting of high silica pentasyl zeolite, dealuminized fogersite, and mesoporous silicate, a heat exchanger, a cooler and a changeover valve are attached to a lead pipe for feeding gas containing oxygen for connecting the ozone generating apparatus to the adsorbing layers in an adsorbing process, a lead pipe for circulating oxygen concentrated gas at a relatively low temperature flowing out from the adsorbing layers is connected to the heat exchanger through a changeover valve, the gas containing ozone is precooled by the oxygen concentrated gas at a relatively low temperature in the heat exchanger, the outlet side of the oxygen concentrated gas at a relatively low temperature of the heat exchanger is connected to the oxygen material supply side of the silent discharge ozone generating apparatus through a lead pipe so as to recycle the oxygen concentrated gas, a lead pipe for feeding purge gas is branched off from the lead pipe for circulating oxygen concentrated gas at a relatively low temperature and is connected to the adsorbing layers in a desorbing process, a heater and a changeover valve are attached to the lead pipe for feeding purge gas so that the oxygen concentrated gas at a relatively low temperature may be supplied to the adsorbing layers as heating purge gas, other end of the adsorbing layers in the desorbing process is connected to a lead pipe for recovering high concentration ozone gas through the changeover valve, and all the changeover valves are changed over simultaneously to use the adsorbing layers alternately in the adsorbing process and desorbing process.

(26) A manufacturing apparatus of high concentration ozone gas, comprising an ozone generating apparatus, and a merry-go-round type temperature swing adsorbing apparatus having three or more adsorbing layers filled with ozone adsorbent, in which the ozone generating apparatus is a silent discharge ozone generating apparatus, the ozone adsorbent is one or two or more kinds of adsorbent selected from the group consisting of high silica pentasyl zeolite, dealuminized fogersite, and mesoporous silicate, a lead pipe for feeding gas containing ozone from the ozone generating apparatus and a lead pipe for circulating oxygen concentrated gas can be connected before and after the adsorbing layers in an adsorbing process, a lead pipe for feeding heating purge gas and a lead pipe for recovering high concentration ozone gas can be connected before and after the adsorbing layers in a desorbing process, a lead pipe for feeding cooling gas branched off from the lead pipe for circulating the oxygen concentrated gas and a lead pipe for recovery of the cooling gas can be connected before and after the adsorbing layers in a cooling process, the adsorbing process, desorbing process and cooling process are transferred sequentially by rotating the merry-go-round composed of the adsorbing layers, a heat exchanger and a cooler are attached to the lead pipe for feeding gas containing oxygen, the lead pipe for circulating oxygen concentrated gas is connected to the heat exchanger, the gas containing ozone is precooled by the oxygen concentrated gas at relatively low temperature flowing out from the adsorbing layers in the adsorbing process, and is further cooled to the adsorbing temperature by the cooler, and the outlet side of the oxygen concentrated gas at a relatively low temperature of the heat exchanger is connected to oxygen material supply side of the silent discharge ozone generating apparatus through a lead pipe so that the oxygen concentrated has can be recycled.

In this constitution, the invention of the second group can efficiently concentrate the oxygen even in the presence of moisture, and thereby the manufacturing apparatus of high concentration ozone gas is reduced in size, and the manufacturing cost and running cost of the apparatus are substantially reduced. Moreover, by feeding the concentrated oxygen gas flowing out from the adsorbing process into the hydrogen electrode of the water electrolytic ozone generating apparatus, the oxygen depolarizing action is promoted, and the power to be applied can be decreased. Besides, by returning the concentrated oxygen gas flowing out from the adsorbing process to the oxygen material side of the silent discharge ozone generating apparatus, the concentrated oxygen can be utilized effectively.

DETAILED DESCRIPTION OF THE PREFERRED EMBODIMENTS

Figure 1:
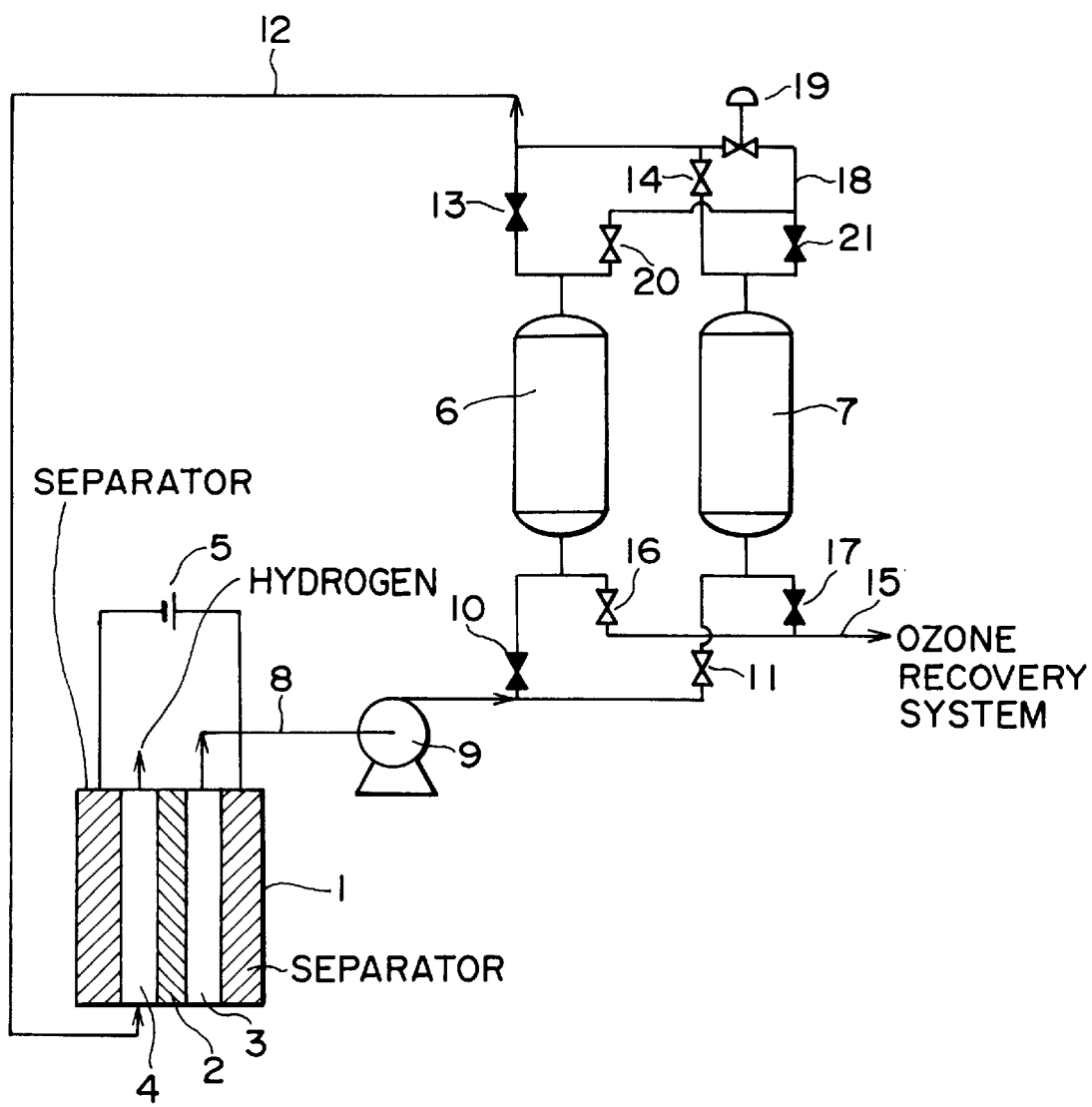
FIG. 1 is a conceptual diagram of a manufacturing apparatus of high concentration ozone in a first group of the invention, in which a water electrolytic ozone generating apparatus and a pressure swing adsorbing apparatus for concentrating ozone are combined.

The present inventors discovered that high silica ozone adsorbents, in particular, high silica pentasyl zeolite, dealuminized fogersite such as ultra-stable Y type zeolite (USY), and mesoporous silicate such as MCM-41, FSM-16, low temperature acidic synthetic mesoporous silicate having tetra ethoxy silane as silica source and low temperature acidic synthetic mesoporous silicate having low molecular silicic acid as silica source, have an excellent ozone adsorbing capability even in the presence of moisture, and attempted to apply them in the pressure swing adsorbing apparatus for concentrating ozone and succeeded in manufacturing high concentration ozone gas efficiently, thereby enabling to reduce the size of the manufacturing apparatus of high concentration ozone gas, and substantially reduce the manufacturing cost and running cost of the apparatus.

The high silica pentasyl zeolite used in the invention has an excellent ozone adsorbing capability, and it can be obtained by hydrothermal synthesis at 150 to 180° C., by using sodium silicate or fumed silica as silica source, and tetrapropyl ammonium bromide as organic template. The high silica pentasyl zeolite of the present invention is preferred to have the $SiO_2/Al_2O_3$ ratio of 70 or more, preferably 100 or more. Although the high silica pentasyl zeolite itself has been known, it was first discovered by the present inventors that it has such ozone adsorbing capability as mentioned above.

The dealuminized fogersite used in the present invention has an excellent ozone adsorbing capability even in the presence of moisture, and by treating Na-Y type zeolite having the $SiO_2/Al_2O_3$ ratio of about 5 in ammonia water, it can be manufactured by removing the majority of Al of the zeolite skeleton. The dealuminized fogersite of the present invention is preferred to have the $SiO_2/Al_2O_3$ ratio of 20 or more, preferably 50 or more. Although the dealuminized fogersite itself has been known, it was first discovered by the present inventors that it has such ozone adsorbing capability as mentioned above.

The mesoporous silicate used in the present invention is a porous substance of silica compound having meso pores of 10 to 1000 Å, and has an excellent ozone adsorbing capability even in the presence of moisture. The mesoporous silicate of the present invention can be manufactured in various methods, and its $SiO_2/Al_2O_3$ ratio is preferred to be 20 or more, preferably 50 or more. Although the mesoporous silicate itself has been known as mentioned below, it was first discovered by the present inventors that it has such ozone adsorbing capability as mentioned above.

For example, MCM-41 was developed by Mobil, which is a mesoporous silicate with the specific surface area of about 1600m$^2$/g and $SiO_2/Al_2O_3$ ratio of about 1000, obtained by hydrothermal synthesis at temperature of 140° C. and pH 13.5, by using water glass or sodium silicate as silica source, and cationic surface active agent (with 8 or more carbon atoms) as organic template.

Still more, FSM-16 is a mesoporous silicate with the $SiO_2/Al_2O_3$ ratio of about 1000 obtained by intercalation of cationic surface active agent in Kanemite developed by Kuroda, Inada, et al., and has a structure similar to that of MCM-41.

Low temperature mesoporous silicate (1) is obtained by a method proposed by Stucky et al., and is synthesized at pH 1 or less at room temperature, using tetraethoxy silane (TEOS) as silica source and cationic surface active agent as organic template. Low temperature mesoporous silicate (2) is obtained by a method developed by the present inventors, and is synthesized at pH 1 or less at room temperature, using condensation-polymerized silica-free silicic acid as silica source and cationic surface active agent as organic template. These low temperature mesoporous silicates may be manufactured in a wide range, depending on the manufacturing conditions, ranging from the $SiO_2/Al_2O_3$ ratio of 10 to a substantially $SiO_2$ only compound.

Invention of First Group

The invention of a first group provides a method and apparatus for manufacturing high concentration ozone gas characterized by manufacturing gas containing ozone by an ozone generating apparatus such as silent discharge apparatus or water electrolytic apparatus, using plural adsorbing layers filled with specific high silica ozone adsorbent, adsorbing ozone by feeding the gas containing ozone into the adsorbing layers in an adsorbing process at a relatively high pressure, while desorbing ozone by setting the adsorbing layers in a desorbing process at a relatively low pressure, feeding purge gas in the desorbing process if necessary, and employing a pressure swing adsorbing system for alternately changing over the adsorbing layers between the adsorbing process at a relatively high pressure and the desorbing process at a relatively low pressure in a short time, thereby concentrating the ozone.

In the invention of the first group, by using a silent discharge apparatus of high pressure as the ozone generating apparatus, and returning the high pressure oxygen concentrated gas flowing out from the adsorbing process of the pressure swing adsorbing apparatus for concentrating ozone to the material side of the silent discharge ozone generating apparatus to be used as oxygen material, the gas containing ozone flowing out from the silent discharge apparatus can be recovered at high pressure, and the load of the compressor for feeding to the pressure swing adsorbing apparatus can be reduced. As the oxygen material gas to be supplied into the silent discharge ozone generating apparatus, the high pressure oxygen concentrated gas manufactured in the pressure swing adsorbing apparatus for concentrating oxygen can be used, which is effective for efficiency and performance of the entire apparatus.

By using a water electrolytic apparatus of high pressure as the ozone generating apparatus, and returning part of the oxygen concentrated gas flowing out from the adsorbing process of the pressure swing adsorbing apparatus for concentrating ozone into the hydrogen electrode chamber of the water electrolytic apparatus to react with hydrogen, it is advantageous because the electric power to be applied in the water electrolytic apparatus can be reduced by the oxygen depolarizing action.

The adsorbing tower transferred to the desorbing process of the pressure swing adsorbing apparatus for concentrating ozone recovers ozone concentrated gas by setting to a relatively low desorbing pressure by using, for example, a decompression pump, but it is also possible to promote desorption by purging by feeding part of the high pressure oxygen concentrated gas flowing out from the desorbing process into the adsorbing layers in the desorbing process through a reducing valve. At this time, if necessary, a heat exchanger or a heater may be attached to the downstream side of the reducing valve to heat the oxygen concentrated gas to a temperature suited to purging.

FIG. 1 is a conceptual diagram of a manufacturing apparatus of high concentration ozone combining a water electrolytic ozone generating apparatus 1 of high pressure, and a two-tower type pressure swing adsorbing apparatus for concentrating ozone. Adsorbing towers 6 and 7 are filled with ozone adsorbent of one or two or more kinds of adsorbent selected from the group consisting of high silica pentasyl zeolite, dealuminized fogersite, and mesoporous silicate. The water electrolytic ozone generating apparatus 1 consists of an ozone electrode chamber 3 such as $PbO_2$, and a hydrogen electrode chamber 4 such as Pt, with an ion exchange film 2 placed between them, and by connecting a direct-current power source 5, electrons are supplied, and ozone is generated in the ozone electrode chamber 3 while hydrogen is generated in the hydrogen electrode chamber 4.

FIG. 1 shows the state of holding the adsorbing tower 6 in an adsorbing process and the adsorbing tower 7 in a desorbing process, by opening changeover valves 10, 13, 17, 21, and closing changeover valves 11, 14, 16, 20, and by opening and closing the changeover valves reversely, the process can be changed over from absorption to desorption, and from desorption to adsorption. The gas containing ozone from the ozone generating apparatus 1 is pressurized to an adsorbing pressure by a compressor 9 provided on a lead pipe 8, and is supplied into the adsorbing tower 6 in the adsorbing process to adsorb ozone on the adsorbent, and the oxygen concentrated gas flowing out from the adsorbing tower 6 is supplied into the hydrogen electrode chamber 4 of the water electrolytic ozone generating apparatus 1 through a lead pipe 12, and the power consumption of the ozone generating apparatus is saved by the oxygen depolarizing action. By using the water electrolytic ozone generating apparatus of high pressure, since the load of the compressor for feeding gas containing ozone to the pressure swing adsorbing apparatus can be reduced, the efficiency and performance of the entire apparatus can be enhanced.

On the other hand, the ozone recovering system is held at a desorbing pressure, and by opening the changeover valve 17 of a lead pipe 15, ozone is recovered by decompressed desorption from the adsorbing tower 7 in the desorbing process. Part of the high pressure oxygen concentrated gas flowing out from the adsorbing tower 6 in the desorbing process is reduced to a desorbing pressure by a reducing valve 19 provided in a lead pipe 18 for feeding purge gas branched off from the lead pipe 12, and supplied into the adsorbing tower 7 in the desorbing process to purge by back wash, so that the desorption may be promoted. When the purge gas is used in a large volume, the ozone concentration is lowered by the corresponding portion. The purge rate is preferably in a range of 1 to 2, more preferably in a range of 1.2 to 1.5 (see FIG. 7).

Figure 2:
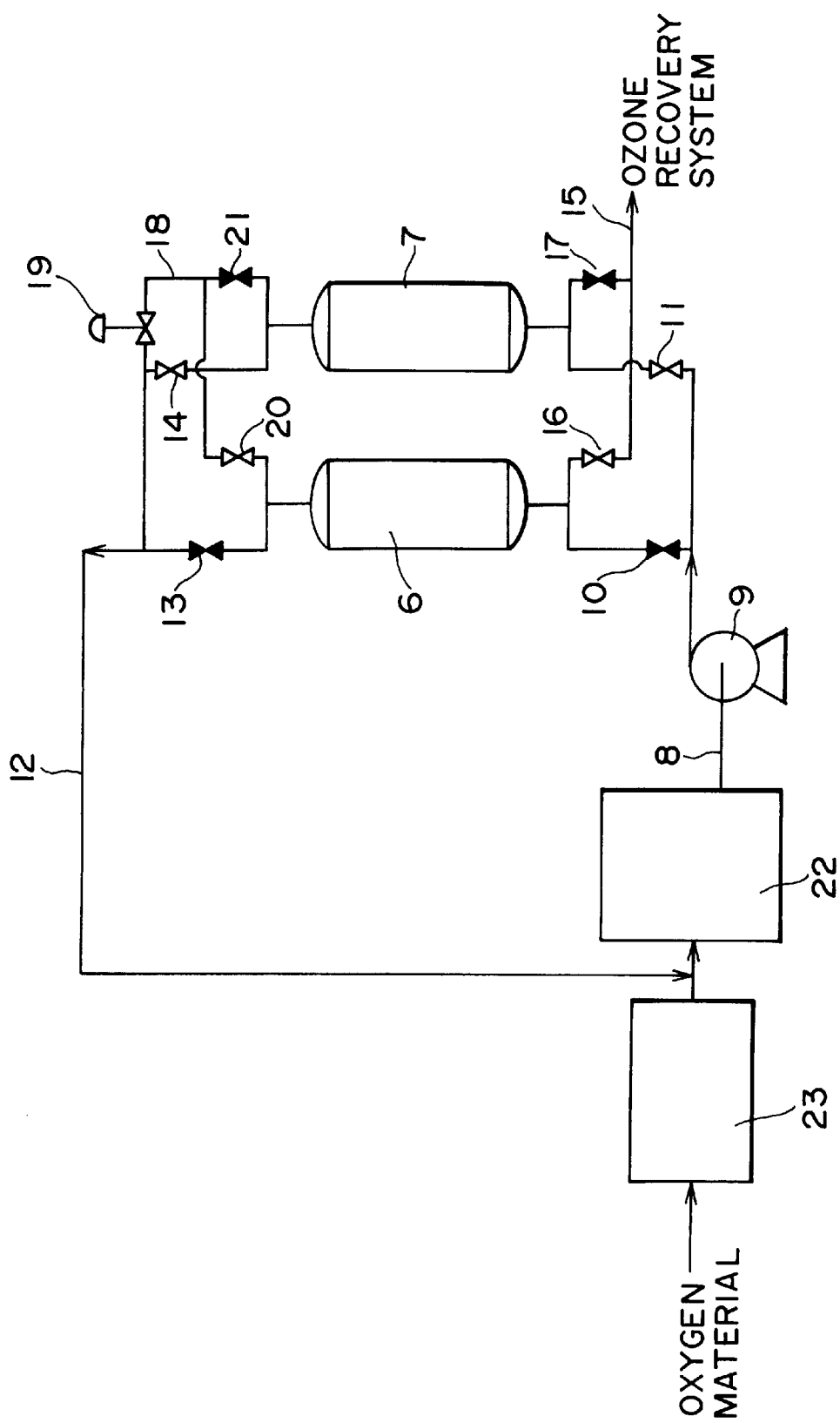
FIG. 2 is a conceptual diagram of other manufacturing apparatus of high concentration ozone in the first group of the invention, in which a silent discharge ozone generating apparatus and a pressure swing adsorbing apparatus for concentrating ozone are combined.

FIG. 2 is a conceptual diagram of a manufacturing apparatus of high concentration ozone using a silent discharge ozone generating apparatus 22 of high pressure, instead of the water electrolytic ozone generating apparatus of high pressure in the manufacturing apparatus of high concentration ozone in FIG. 1, and the structure of the pressure swing adsorbing apparatus is same as in the apparatus in FIG. 1, and the reference numerals of the apparatus are hence matched. In FIG. 2, a pressure swing adsorbing apparatus 23 for concentration oxygen is attached before the silent discharge ozone generating apparatus 22. This pressure swing adsorbing apparatus 23 for concentrating oxygen is not essential, but is effective for enhancing the efficiency and performance of the entire apparatus.

The adsorption cycle of the pressure swing adsorbing apparatus for concentrating ozone is same as in the case of FIG. 1, but part of the high pressure oxygen concentrated gas flowing out from the adsorbing tower 6 in the adsorbing process is, if necessary, returned to the lead pipe for feeding oxygen material of the silent discharge ozone generating apparatus 22 through the lead pipe 12, so that the oxygen concentrated gas can be used effectively. Furthermore, by using the silent discharge ozone generating apparatus of high pressure, the load of the compressor 9 for feeding gas containing ozone to the pressure swing adsorbing apparatus can be reduced, and it is effective for enhancing the efficiency and performance of the entire apparatus.

Invention of Second Group

The invention of a second group provides a method and apparatus for manufacturing high concentration ozone gas, characterized by using two or more adsorbing layers filled with ozone adsorbent, employing a temperature swing adsorbing system for transferring the adsorbing layers from an adsorbing process at a relatively low temperature to a desorbing process at a relatively high temperature, and further returning to the adsorbing process, precooling gas containing ozone from an ozone generating apparatus and feeding into the adsorbing layers in the adsorbing process, discharging oxygen concentrated gas at a relatively low temperature from the adsorbing layers, passing purge gas at a relatively high temperature into the adsorbing layers in the desorbing process in an opposite direction of the gas flow in the adsorbing process, and recovering the concentrated ozone gas continuously, in which the ozone adsorbent is a specific high silica ozone adsorbent excellent in ozone adsorbing capability even in the presence of moisture.

In the invention of the second group, it is preferred to utilize the cooling energy effectively by cooling the gas containing ozone from the ozone generating apparatus by oxygen concentrated gas at a relatively low temperature flowing out from the adsorption process of the temperature swing adsorbing apparatus for concentrating ozone.

When using a water electrolytic ozone generating apparatus as the ozone generating apparatus, it is preferred to reduce the electric power to be applied by the oxygen depolarizing action of the water electrolytic apparatus by returning part of the oxygen concentrated gas flowing out from the adsorbing process of the temperature swing adsorbing apparatus for concentrating ozone into the hydrogen electrode chamber of the water electrolytic ozone generating apparatus.

Further, by using a silent discharge apparatus as the ozone generating apparatus, it is preferred to utilize the oxygen effectively by returning the oxygen concentrated gas at a relatively low temperature flowing out from the adsorbing process of the temperature swing adsorbing apparatus for concentrating ozone to the oxygen material side of the silent discharge ozone generating apparatus.

Figure 8:
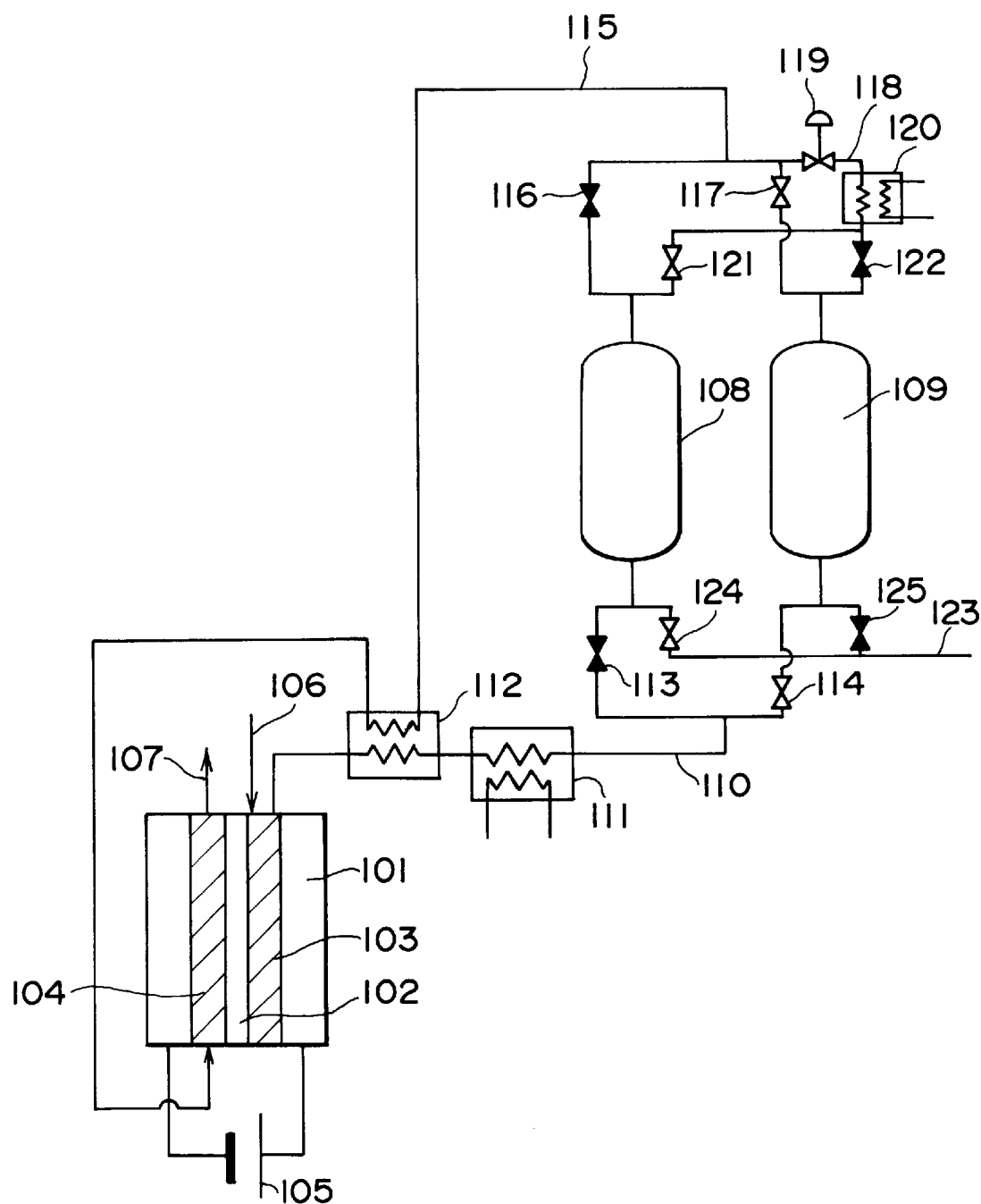
FIG. 8 is a conceptual diagram of a manufacturing apparatus of high concentration ozone in a second group of the invention, in which a water electrolytic ozone generating apparatus and a temperature swing adsorbing apparatus for concentrating ozone are combined.

FIG. 8 is a conceptual diagram of a manufacturing apparatus of high concentration ozone combining a water electrolytic ozone generating apparatus 101, and a two-tower type temperature swing adsorbing apparatus for concentrating ozone. Adsorbing towers 108 and 109 are filled with ozone adsorbent of one or two or more kinds of adsorbent selected from the group consisting of high silica pentasyl zeolite, dealuminized fogersite, and mesoporous silicate. The ozone adsorbent may be used also by forming in a honeycomb structure. The water electrolytic ozone generating apparatus 101 consists of an ozone electrode chamber 103 such as $PbO_2$, and a hydrogen electrode chamber 104 such as Pt, with an ion exchange film 102 placed between them, and by connecting a direct-current power source 105, electrons are supplied, and ozone is generated in the ozone electrode chamber 103 while hydrogen is generated in the hydrogen electrode chamber 104.

In the apparatus shown in FIG. 8, by opening changeover valves 113, 116, 122, 125, and closing changeover valves 114, 117, 121, 124, same as in FIG. 1, the adsorbing tower 108 is set in an adsorbing process and the adsorbing tower 109 in a desorbing process, and by opening and closing the changeover valves reversely after the processes, the adsorbing tower 108 is transferred from absorption process to desorption process, and the adsorbing tower 109, from desorption process to adsorption process. A heat exchanger 112 and a cooler 111 are attached to a lead pipe 110 for feeding gas containing ozone for connecting the ozone electrode chamber 103 and adsorbing tower 108 of the water electrolytic ozone generating apparatus 101, and the gas containing ozone is cooled to an adsorbing temperature, and is supplied into the adsorbing tower 108 in the adsorbing process to adsorb ozone, and the oxygen concentrated gas at a relatively low temperature flowing out from the adsorbing tower 108 is sent into the heat exchanger 112 through a lead pipe 115 to precool the gas containing ozone. The oxygen concentrated gas at a relatively low temperature flowing out from the heat exchanger 112 is fed into the hydrogen electrode chamber 104 of the water electrolytic ozone generating apparatus 101 to react with hydrogen, and the electric power to be applied in the water electrolytic ozone generating apparatus 101 is decreased by the oxygen depolarizing action. Reference numeral 106 is a lead pipe for feeding water, and 107 is a lead pipe for discharging hydrogen from the hydrogen electrode chamber. Reference numeral 105 is a direct-current power source.

On the other hand, part of the oxygen concentrated gas at a relatively low temperature flowing out from the adsorbing tower 108 is supplied into the adsorbing tower 109 in the desorbing process to heat, purge and desorb the ozone through a lead pipe 118 and, if necessary, a reducing valve 119 and a heater 120, and high concentration ozone gas is recovered from a lead pipe 123. At this time, when the purge gas is used in a large volume, the ozone concentration is lowered by the corresponding portion. The purge rate is preferably in a range of 1 to 2. As the purge gas, instead of the oxygen concentrated gas, nitrogen, dry air, argon, helium or the like may be used, and supplied from outside.

Figure 9:
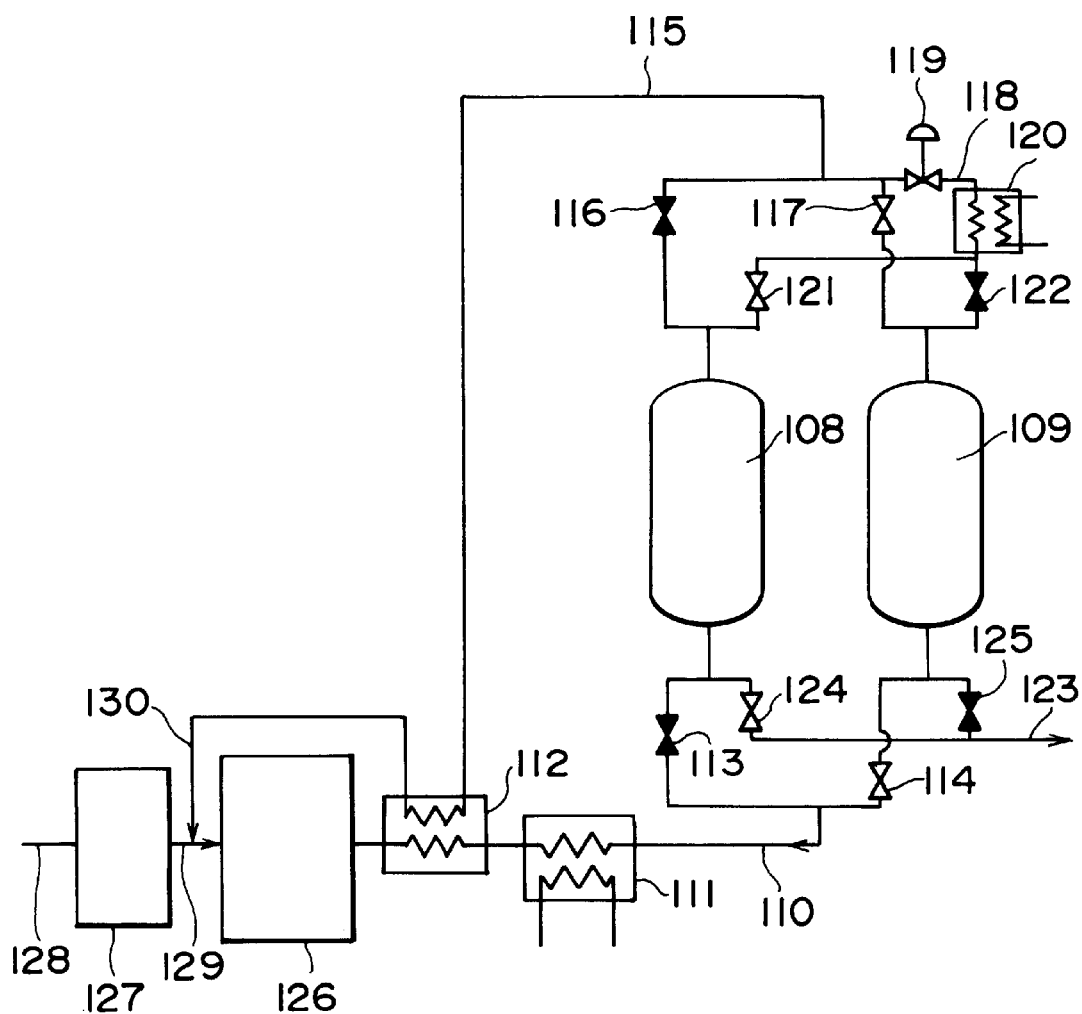
FIG. 9 is a conceptual diagram of other manufacturing apparatus of high concentration ozone in the second group of the invention, in which a silent discharge ozone generating apparatus and a temperature swing adsorbing apparatus for concentrating ozone are combined.

FIG. 9 is a conceptual diagram of a manufacturing apparatus of high concentration ozone using a silent discharge ozone generating apparatus 126, instead of the water electrolytic ozone generating apparatus in the manufacturing apparatus of high concentration ozone in FIG. 8. The parts common to the apparatus in FIG. 8 are identified with same reference numerals. In FIG. 9, a temperature swing adsorbing apparatus 127 for concentration oxygen is attached before the silent discharge ozone generating apparatus 126, but this adsorbing apparatus is not essential. However, considering matching of the entire apparatus, it is preferred to employ it. In the apparatus in FIG. 9, oxygen material, for example, air is supplied into the temperature swing adsorbing apparatus 127 for concentrating oxygen through a lead pipe 128, and the concentrated oxygen gas is discharged from a lead pipe 129, and is supplied into the silent discharge ozone generating apparatus 126. The adsorption cycle of the temperature swing adsorbing apparatus for concentrating ozone is same as in the case of FIG. 8, but part of the oxygen concentrated gas flowing out from the adsorbing tower in the adsorbing process is preferred to be returned to the oxygen material side of the silent discharge ozone generating apparatus 126 through a lead pipe 130 by way of the heat exchanger 112 for precooling the gas containing ozone, so that the oxygen can be utilized effectively.

Figure 10:
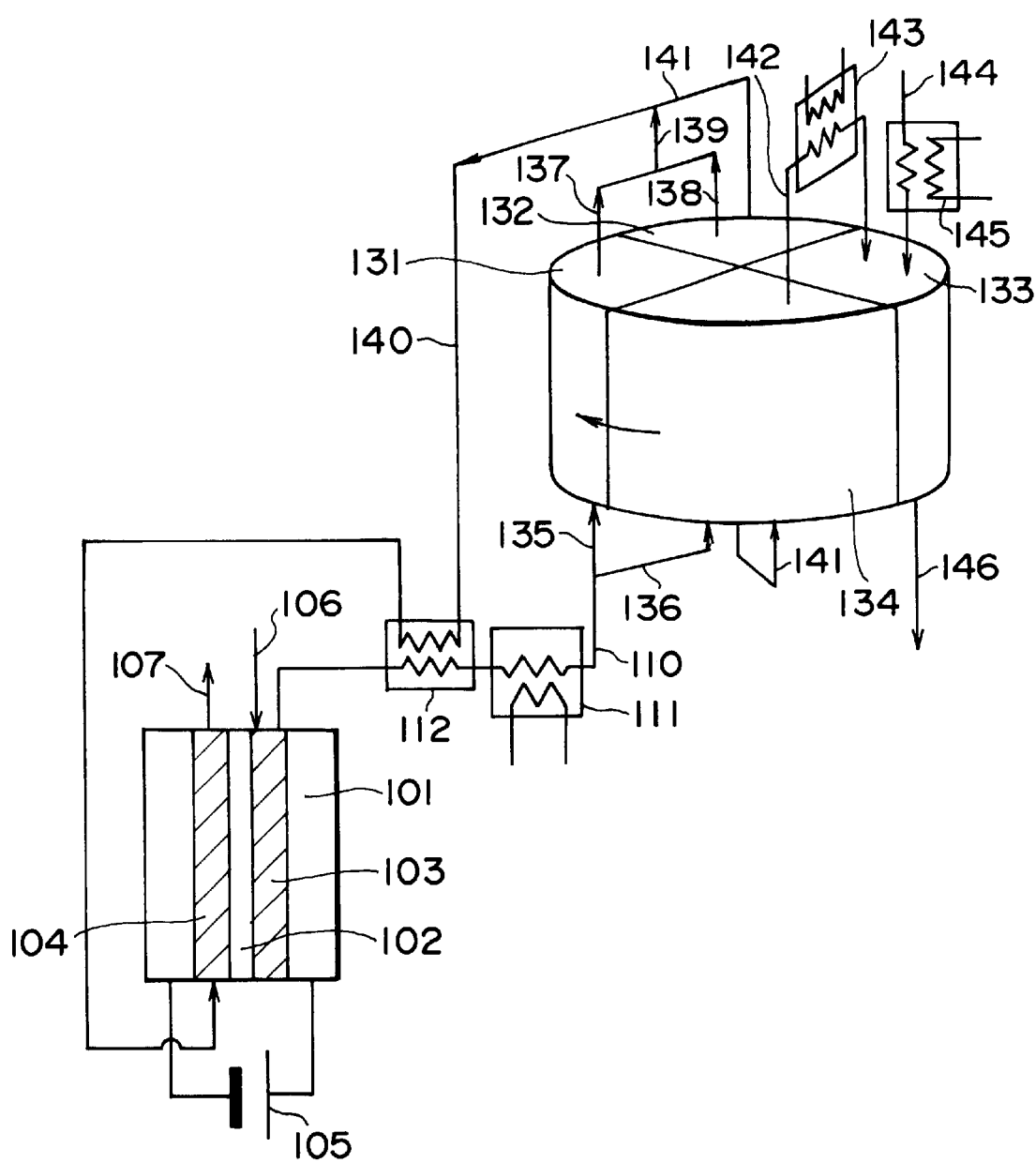
FIG. 10 is a conceptual diagram of a different manufacturing apparatus of high concentration ozone in the second group of the invention, in which a water electrolytic ozone generating apparatus and a merry-go-round type temperature swing adsorbing apparatus for concentrating ozone are combined.

FIG. 10 is a conceptual diagram of a manufacturing apparatus of high concentration ozone combining a water electrolytic ozone generating apparatus 101 and a merry-go-round type temperature swing adsorbing apparatus for concentrating ozone consisting of adsorbing layers 131 to 134. In the state shown in FIG. 10, the adsorbing layers 131 and 132 are in an adsorbing process, the adsorbing layer 133 in a desorbing process, and the adsorbing layer 134 in a cooling process following the desorbing process. The adsorbing layers may be further divided depending on the necessity, and plural adsorbing layers may be used according to the cycle time of each process. The merry-go-round of the adsorbing layers is rotated in the arrow direction, and the processes can be transferred sequentially without using changeover valve. The gas containing ozone generated in the ozone electrode chamber 103 of the water electrolytic ozone generating apparatus 101 is cooled to an adsorbing temperature by the heat exchanger 112 and cooler 111 of the lead pipe 110, and is supplied into the adsorbing layers 131 and 132 in the adsorbing process to adsorb ozone, and the oxygen concentrated gas at a relatively low temperature flowing out from these adsorbing layers is supplied into the heat exchanger through lead pipes 137, 138, 139, and 140, and further into the hydrogen electrode chamber 104 of the water electrolytic ozone generating apparatus 101, thereby depolarizing the oxygen.

Part of oxygen concentrated gas at a relatively low temperature flowing out from the adsorbing layers 131 and 132 in the adsorbing process is supplied into the adsorbing layer 134 in the cooling process through a lead pipe 141 branched off from the lead pipe 139, and cools the adsorbing layer 134 after finishing the desorbing process. When the oxygen concentrated gas flowing out from this adsorbing layer 134 is used as purge gas, a heater 143 is attached to a lead pipe 142, and after heating to a desorbing temperature, it is supplied into the adsorbing layer 133 in the desorbing process to heat, purge and desorb. When a purge gas for desorbing is used separately, the purge gas is supplied from a lead pipe 144, and after heating to a desorbing temperature by a heater 145, it is similarly supplied into the adsorbing layer 133, and the desorbed high concentration ozone gas is sent into the recovery system through a lead pipe 146.

Figure 11:
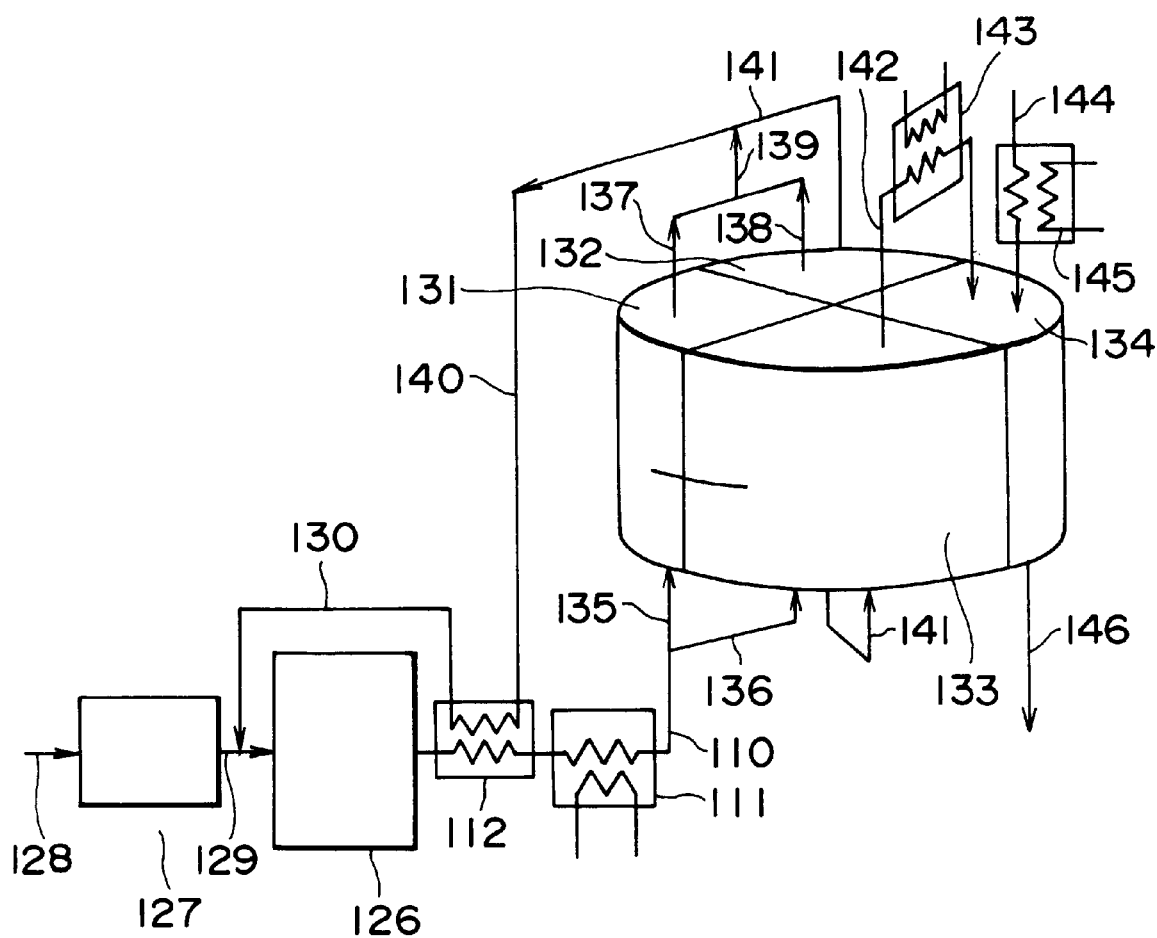
FIG. 11 is a conceptual diagram of other different manufacturing apparatus of high concentration ozone in the second group of the invention, in which a silent discharge ozone generating apparatus and a merry-go-round type temperature swing adsorbing apparatus for concentrating ozone are combined.

FIG. 11 is similar to the manufacturing apparatus of high concentration ozone in FIG. 10, using a silent discharge ozone generating apparatus 126, instead of the water electrolytic ozone generating apparatus, and the parts common to the apparatus in FIG. 10 are identified with same reference numerals In the apparatus in FIG. 11, a temperature swing adsorbing apparatus 127 for concentrating oxygen is attached before the silent discharge ozone generating apparatus 126, and oxygen material, for example, air is supplied into the temperature swing adsorbing apparatus 127 for concentrating oxygen through a lead pipe 128 to concentrate the oxygen, and is supplied into the silent discharge ozone generating apparatus 126 through a lead pipe 129, but in the invention, the temperature swing adsorbing apparatus 127 for concentrating oxygen is not essential. The adsorbing operation of the merry-go-round type temperature swing adsorbing apparatus for concentrating ozone is same as in the apparatus in FIG. 10. The oxygen concentrated gas at a relatively low temperature flowing out from the adsorbing layers 131 and 132 in the adsorbing process precools, same as in the apparatus shown in FIG. 10, the gas containing ozone by the heat exchanger 112, and is returned to the oxygen material side of the silent discharge ozone generating apparatus 126 through a lead pipe 130, so that the concentrated oxygen gas can be utilized effectively.

EXAMPLES (Example 1)

The adsorbing towers of the manufacturing apparatus of high concentration ozone in FIG. 1 were filled with the ozone adsorbents according to the present invention, that is, high silica pentasyl zeolite, dealuminized fogersite, and mesoporous silicate, and a conventional ozone adsorbent, silica gel, and the ozone concentration rate were measured, and the ozone adsorbing capabilities were compared. Herein, the adsorbing towers were filled with 5 kg each of the high silica pentasyl zeolite with the $SiO_2/Al_2O_3$ ratio of 100, dealuminized fogersite with the $SiO_2/Al_2O_3$ ratio of 70, mesoporous silicate with the $SiO_2/Al_2O_3$ ratio of 1000, and commercial silica gel.

In the water electrolytic ozone generating apparatus, ozone gas (ozone concentration 10%) composed of 10 vol.

% of O₃, 87 vol. % of O₂, and 3 vol. % of H₂O was generated, and pressurized to 1.1 atm by a compressor, and supplied into the adsorbing tower in the adsorbing process at a gas flow rate of 15 m³ N/h, and ozone was adsorbed. On the other hand, the adsorbing tower in the desorbing process was decompressed by 0.1 atm by a decompression pump, and the ozone was desorbed and recovered without purging. The adsorbing temperature was set at −60° C., −30° C. and 25° C., and the ozone concentration was experimented. In the desorbing process, the temperature of the adsorbing tower was not particularly controlled. The changeover time of the adsorbing process and desorbing process, that is, the cycle time was set at 3 minutes.

Figure 3:
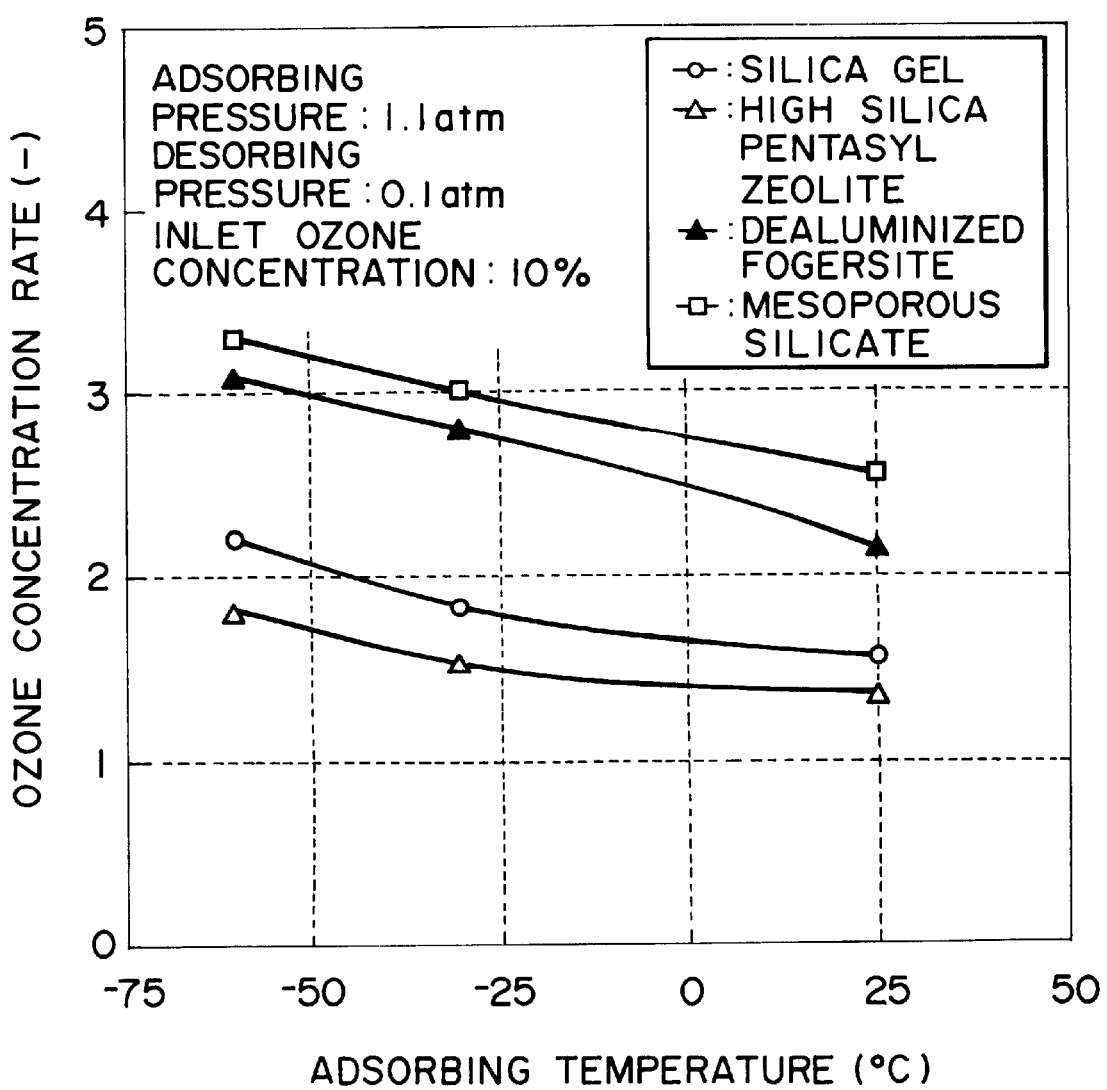
FIG. 3 is a graph comparing the ozone concentrating rate by filling the adsorbing tower of the apparatus in FIG. 1 with mesoporous silicate, dealuminized fogersite, and silica gel.

The ozone concentration of the obtained ozone concentrated gas was measured, and compared with the ozone concentration of the gas produced in the water electrolytic ozone generating apparatus, and the ozone concentration rate was determined, and the adsorbing temperature and the ozone concentration rate are comparatively shown in FIG. 3. As clear from this diagram, as compared with the silica gel, it is known that the dealuminized fogersite and mesoporous silicate show a very large ozone adsorbing capability. Incidentally, the small ozone adsorbing capability of silica gel seems to be due to the effect of moisture in the gas containing ozone.

Considering the capacity of cooler for general use, the adsorbing temperature is preferred to be set at −60° C. or higher, and also considering the use of recovered ozone gas, the adsorbing temperature is preferred to be set at room temperature of 25° C. or less.

(Example 2)

Figure 4:
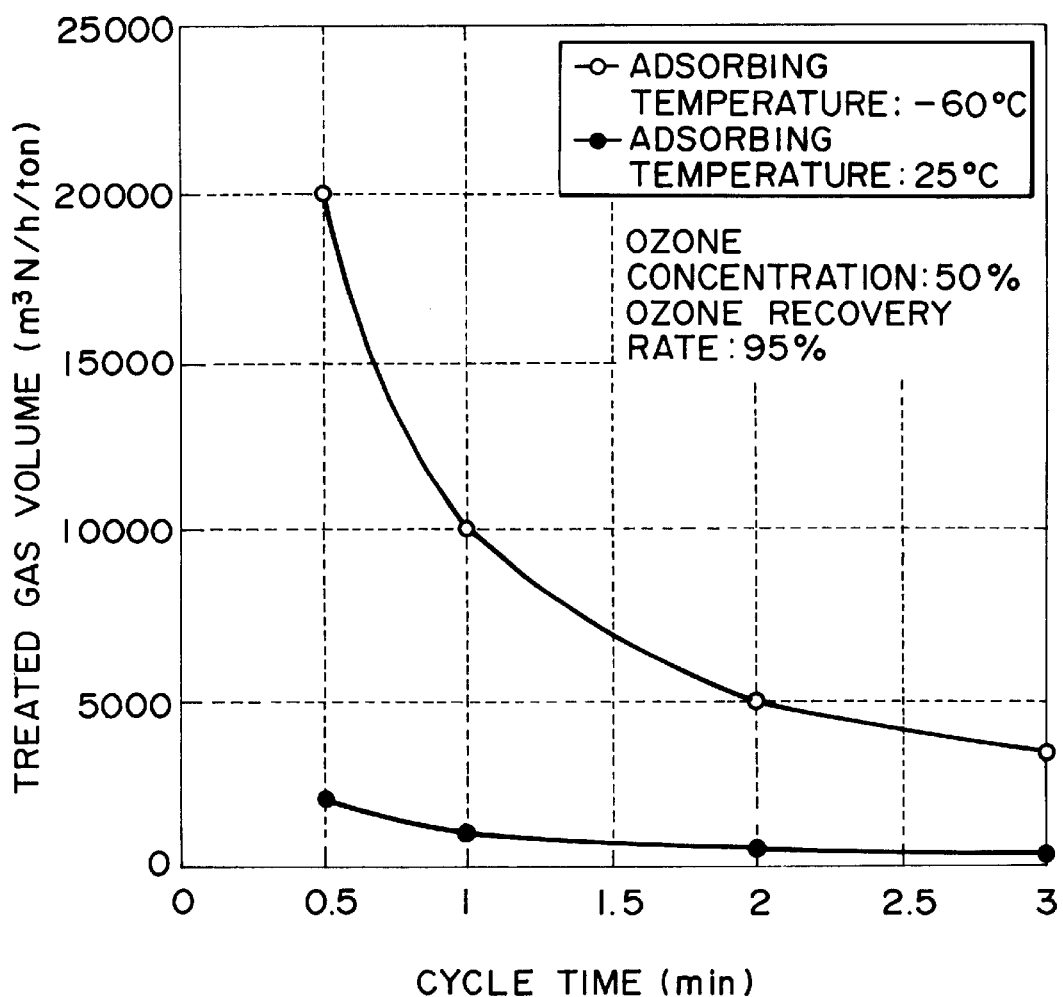
FIG. 4 is a graph showing the treating amount of gas containing ozone by changing the cycle time, with the adsorbing tower of the apparatus in FIG. 1 filled with mesoporous silicate.

Using the mesoporous silicate having the largest ozone adsorbing capability, and changing the cycle time from 0.5 min to 3 min, the treating capacity of gas containing ozone was investigated (m³ N/h/1 ton of adsorbent). In this experiment, using the same apparatus in FIG. 1 as in Example 1, the adsorbing temperature was set at −60° C. and 25° C., the adsorbing pressure was changed to 1.05 atm, and the desorbing pressure to 0.05 atm, and the ozone concentration was experimented same as in Example 1 in all other conditions. Results are shown in FIG. 4.

The ozone concentration of the gas containing ozone from the water electrolytic ozone generating apparatus was 10 vol. %, but the ozone concentration of the gas recovered in the desorbing process was 50 vol. % (ozone concentration rate 5), and the ozone recovery rate was 95%. As clear from the diagram, the treating capacity is larger as the adsorbing temperature is lower and the cycle time is shorter, and a specified treating capacity is obtained by a relatively small amount of adsorbent, and hence it is easy to reduce the size of the adsorbing tower, but a larger cooling energy is required. On the other hand, as the adsorbing temperature is approaching the room temperature, the treating capacity is smaller, but less cooling energy is needed. Near the room temperature, moreover, the effect of cycle time is smaller.

(Example 3)

Using the mesoporous silicate same as in Example 2, and changing the desorbing pressure from 0.04 atm to 0.3 atm, the ozone concentration rate was investigated, and the dependence of desorbing pressure was studied. In this experiment, too, using the same apparatus in FIG. 1 as in Example 1, the ozone concentration was experimented same as in Example 1, except that the adsorbing temperature was set at −60° C, and 25° C. and that the adsorbing pressure was fixed at 1.05 atm. Results are shown in FIG. 5.

Figure 5:
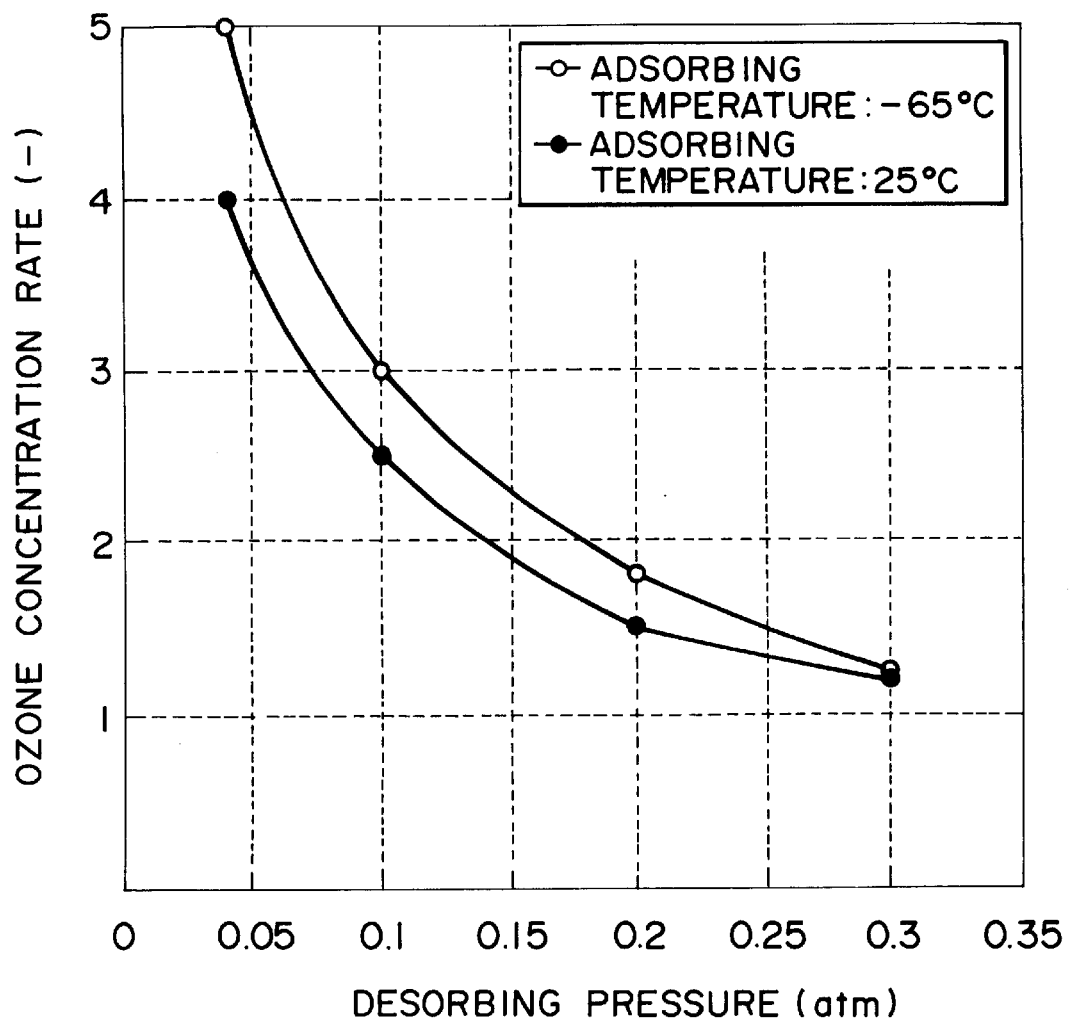
FIG. 5 is a graph showing the ozone concentration rate by changing the desorbing pressure, with the adsorbing tower of the apparatus in FIG. 1 filled with mesoporous silicate.

As clear from FIG. 5, at the desorbing pressure of 0.3 atm, there was almost no difference in the ozone concentration rate between the adsorbing temperature of −60° C. and 25° C., but as the desorbing pressure was lower, the difference in the ozone concentration rate began to increase, and at 0.04 atm, the difference in the ozone concentration rate due to difference in the adsorbing temperature was a difference of 5 times and 4 times.

(Example 4)

Using the mesoporous silicate same as in Example 3, fixing the desorbing pressure at 0.1 atm, and changing the adsorbing pressure from 1 to 5 atm, the ozone concentration rate was investigated, and the dependence of adsorbing pressure was studied. In this experiment, too, using the same apparatus in FIG. 1 as in Example 1, the ozone concentration was experimented same as in Example 1, except that the adsorbing temperature was set at −65° C. and 25° C. Results are shown in FIG. 6.

Figure 6:
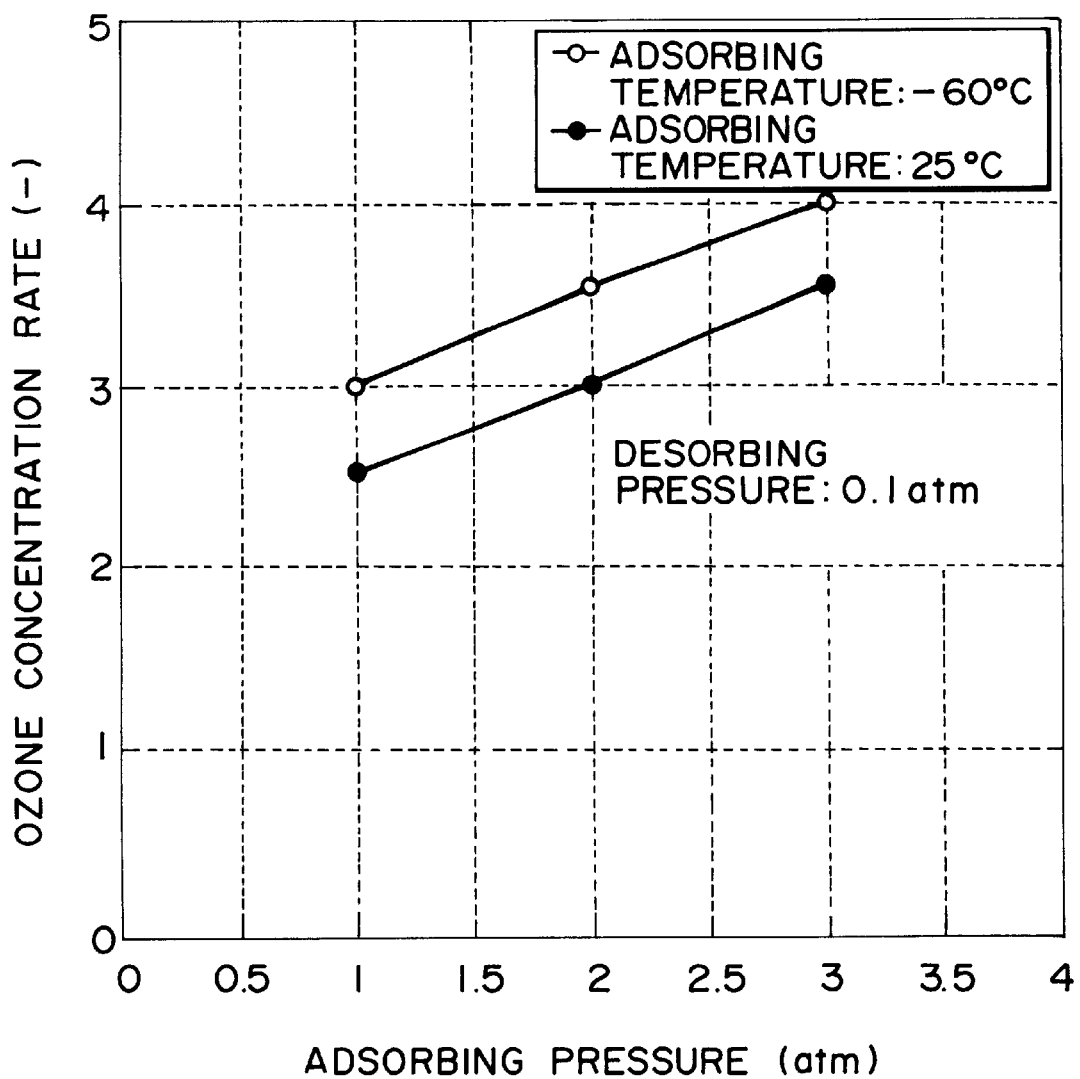
FIG. 6 is a graph showing the ozone concentration rate by changing the desorbing pressure, with the adsorbing tower of the apparatus in FIG. 1 filled with mesoporous silicate.

As clear from FIG. 6, the ozone concentration rate elevated almost proportionally as the adsorbing pressure climbed up, and between the adsorbing temperature of −60° C. and 25° C., the former was higher in the ozone concentration rate by about 0.5 times. Hence, the preferred adsorbing pressure was set in a range of 1.05 to 5 atm.

(Example 5)

Using the mesoporous silicate same as in Example 3, the ozone concentration rate was investigated and the dependence of purge rate was studied, by fixing the adsorbing pressure at 1.05 atm and the desorbing pressure at 0.05 atm, setting the adsorbing temperature at 25° C., not particularly controlling the temperature of the adsorbing tower in the desorbing process, feeding part of oxygen concentrated gas flowing out from the adsorbing tower in the adsorbing process as purge gas into the adsorbing tower in the desorbing process through a reducing valve, adjusting the reducing valve and changing the purge rate in a range of 0.9 to 2. Results are shown in FIG. 7.

Figure 7:
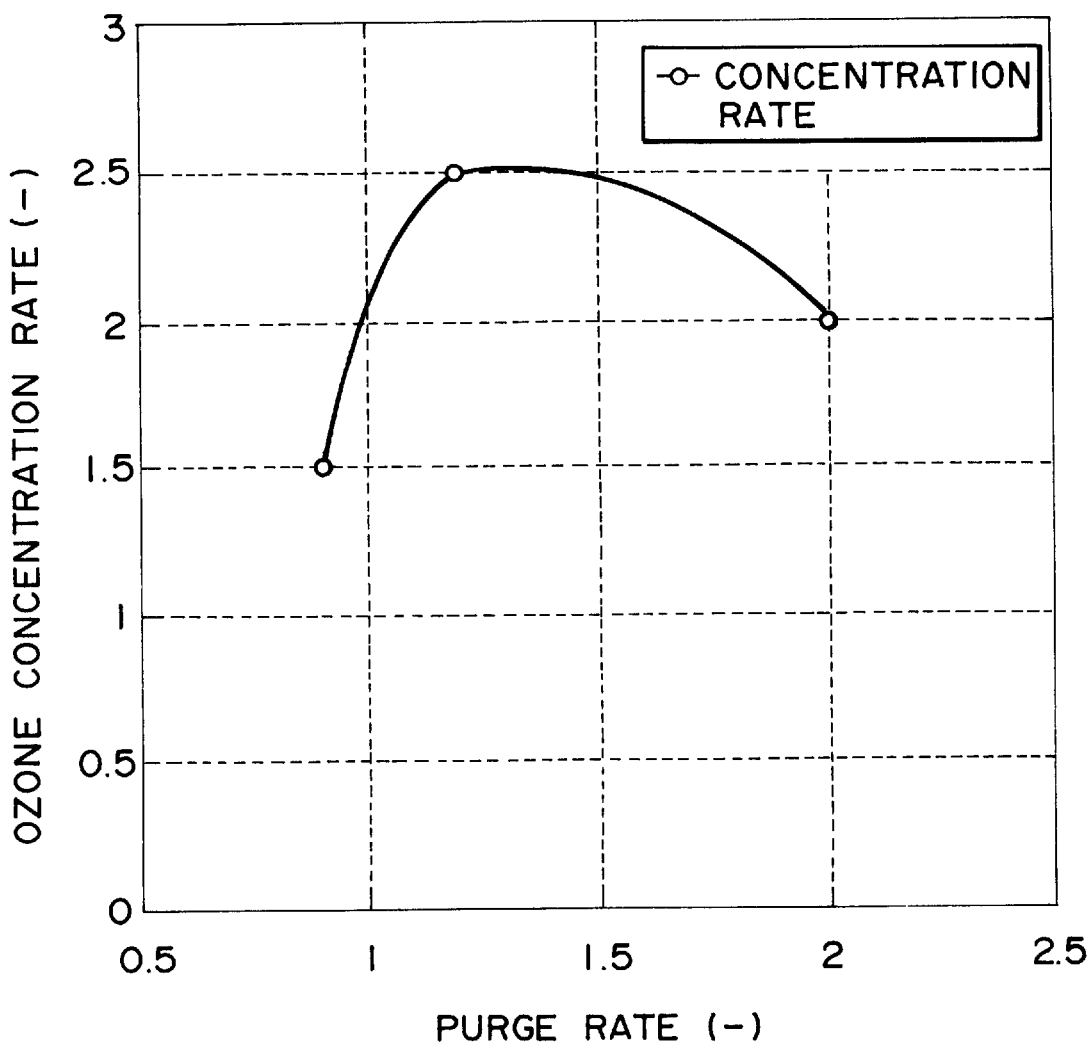
FIG. 7 is a graph showing the ozone concentration rate by changing the purge rate, with the adsorbing tower of the apparatus in FIG. 1 filled with mesoporous silicate.

As clear from FIG. 7, by feeding the purge gas, the ozone concentration rate can be heightened, but as the purge gas volume is increased, the ozone concentration in the recovered gas declines. Hence, in order to maintain the ozone concentration rate at 2 times or more, it is preferred to control the purge rate in a range of 1 to 2.

(Example 6)

The adsorbing towers of the manufacturing apparatus of high concentration ozone in FIG. 8 were filled with the ozone adsorbents of the present invention, that is, high silica pentasyl zeolite, dealuminized fogersite, and mesoporous silicate, and a conventional ozone adsorbent, silica gel, and the ozone concentration rate were measured, and the ozone adsorbing capabilities were compared. Herein, the adsorbing towers were filled with 5 kg each of the high silica pentasyl zeolite with the $SiO_2/Al_2O_3$ ratio of 100, dealuminized fogersite with the $SiO_2/Al_2O_3$ ratio of 70, mesoporous silicate with the $SiO_2/Al_2O_3$ ratio of 1000, and commercial silica gel.

In the water electrolytic ozone generating apparatus, gas containing 10 vol. % of O₃, 87 vol. % of O₂, and 3 vol. % of H₂O (ozone concentration 10%) was generated, and precooled by heat exchange with the oxygen concentrated gas at a relatively low temperature flowing out from the adsorbing tower in the adsorbing process, and then cooled to an adsorbing temperature by a cooler, and supplied into the adsorbing tower in the adsorbing process at a gas flow rate of 15 m³ N/h, and ozone was adsorbed. On the other hand, in the adsorbing tower in the desorbing process, part of oxygen concentrated gas flowing out from the adsorbing tower in the adsorbing process was heated to a desorbing temperature of 25° C., purge gas was passed in opposite direction of the gas flow in the adsorbing process, and the ozone was heated, purged, desorbed, and recovered. The adsorbing temperature was set at −30° C., −50° C. and −100° C., and the ozone concentration was experimented. The changeover time of the adsorbing process and desorbing process, that is, the cycle time was set at 30 minutes, and the purge rate was set at about 1.5 by using a regulating valve.

The adsorbing pressure and desorbing pressure were not particularly adjusted, and were about 1.05 atm.

Figure 12:
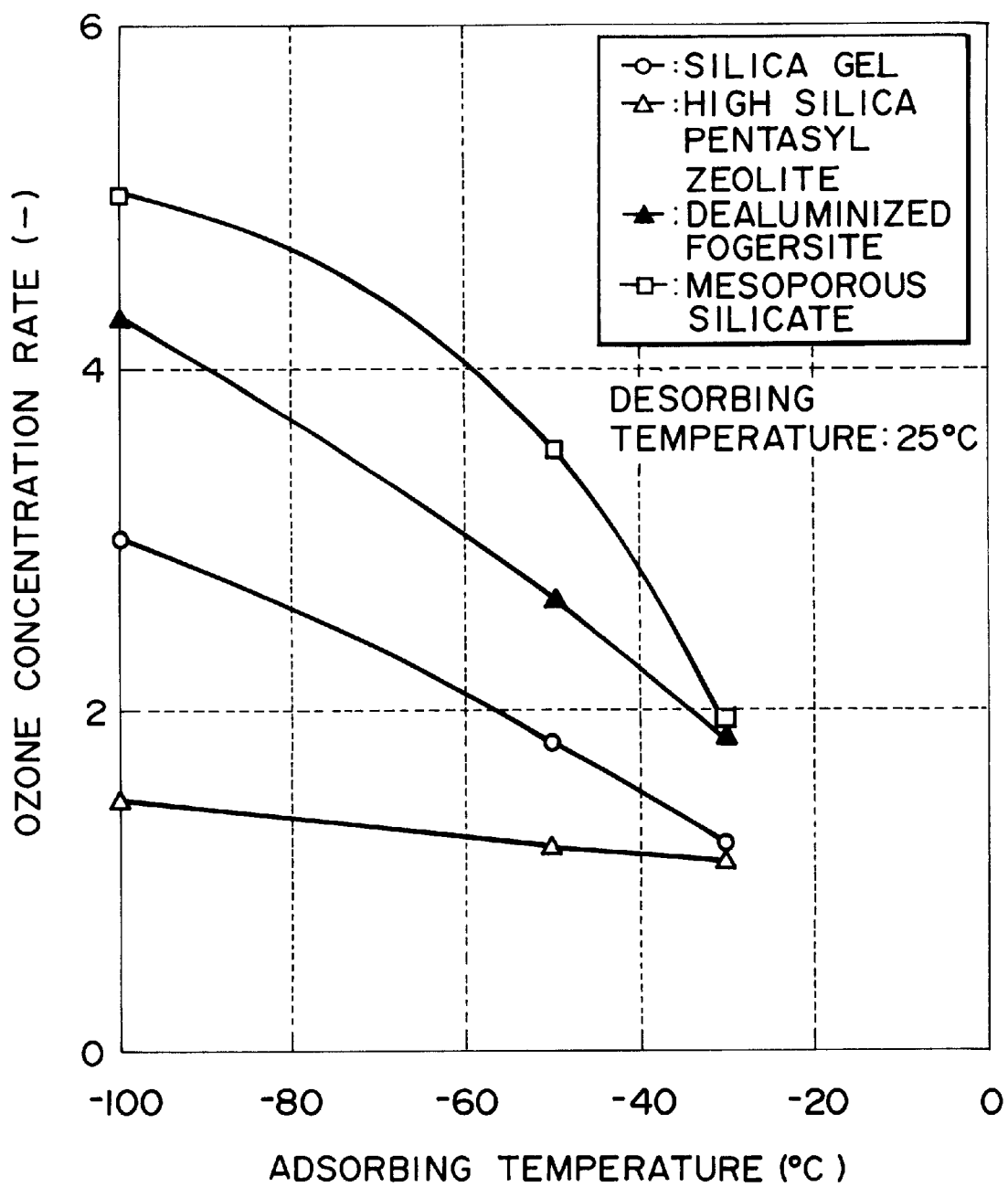
FIG. 12 is a graph comparing the ozone concentrating rate by filling the adsorbing tower of the apparatus in FIG. 8 with high silica pentasyl zeolite, dealuminized fogersite, and mesoporous silicate, and silica gel.

The ozone concentration of the obtained ozone concentrated gas was measured, and compared with the ozone concentration of the gas produced in the water electrolytic ozone generating apparatus, and the ozone concentration rate was determined, and the adsorbing temperature and the ozone concentration rate are comparatively shown in FIG. 12. As clear from this diagram, as compared with the silica gel, it is known that the dealuminized fogersite and mesoporous silicate show a very large ozone adsorbing capability. Incidentally, the small ozone adsorbing capability of silica gel seems to be due to the effect of moisture in the gas containing ozone.

The adsorbing temperature may be selected in a range of −100 to −30° C., but considering the capacity of cooler for general use, the adsorbing temperature is preferred to be set at −60° C. or higher temperature.

(Example 7)

Figure 13:
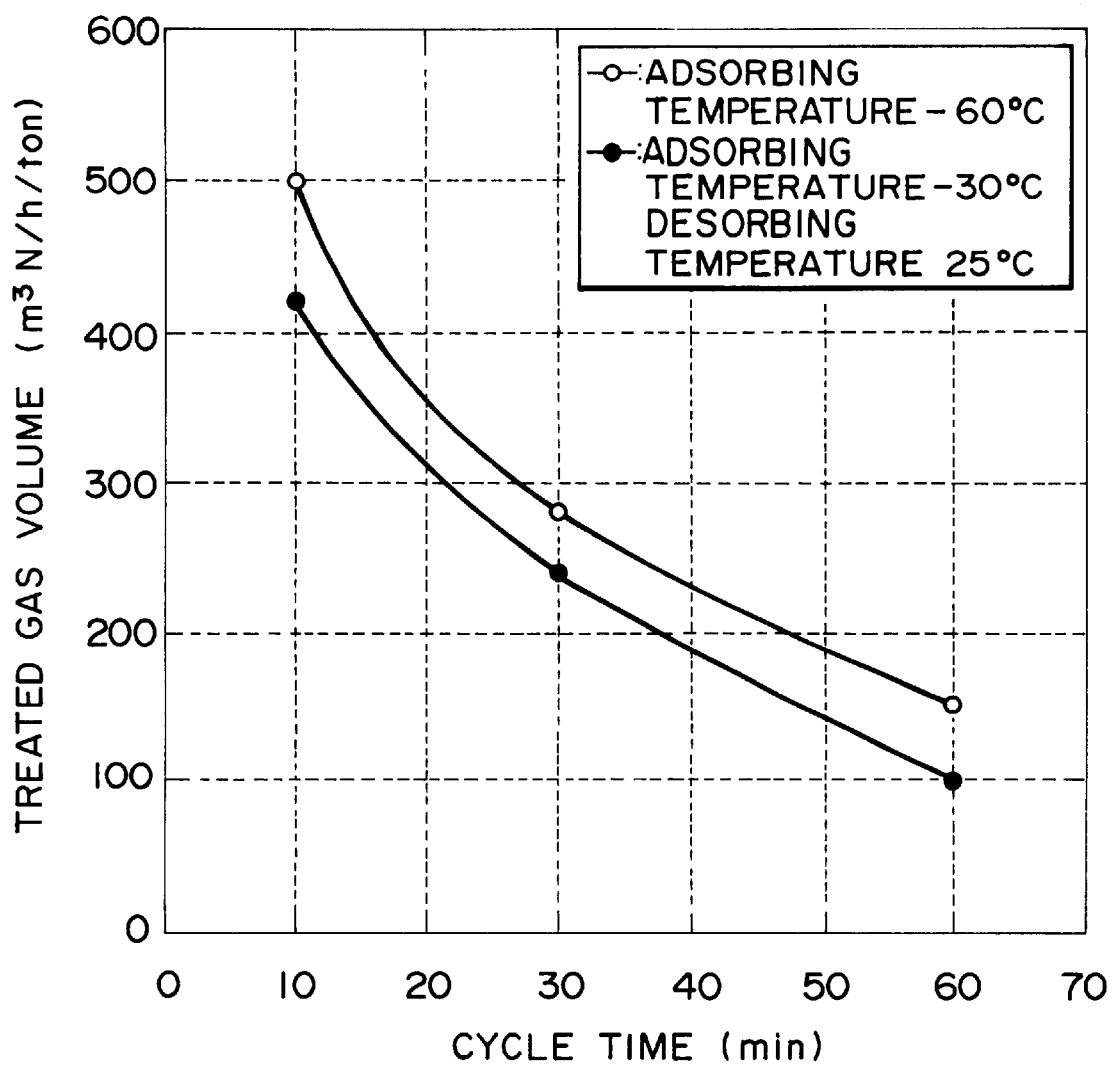
FIG. 13 is a graph showing the treating amount of gas containing ozone by changing the cycle time, with the adsorbing tower of the apparatus in FIG. 8 filled with mesoporous silicate.

Using the mesoporous silicate having the largest ozone adsorbing capability, and changing the cycle time from 10 min to 60 min, the treating amount of gas containing ozone was investigated ($m^3$ N/h/1 ton of adsorbent). In this experiment, using the same apparatus in FIG. 8 as in Example 6, the ozone concentration was experimented same as in Example 6 except that the adsorbing temperature was set at −60° C. and −30° C. Results are shown in FIG. 13.

The ozone concentration of the gas containing ozone from the water electrolytic ozone generating apparatus was 10 vol. %, but the ozone concentration of the gas recovered in the desorbing process was 50 vol. % (ozone concentration rate 5), and the ozone recovery rate was 95%. As clear from the diagram, the treating amount is larger as the adsorbing temperature is lower and the cycle time is shorter, and a specified treating amount is obtained by a relatively small amount of adsorbent, and hence it is easy to reduce the size of the adsorbing tower, but a larger cooling energy is required.

(Example 8)

Using the mesoporous silicate same as in Example 7, and changing the desorbing temperature from 0° C. to 75° C., the ozone concentration rate was investigated, and the dependence of desorbing temperature was studied. In this experiment, too, using the same apparatus in FIG. 8 as in Example 6, the ozone concentration was experimented same as in Example 6, except that the adsorbing temperature was set at −60° C. and −30° C. Results are shown in FIG. 14.

Figure 14:
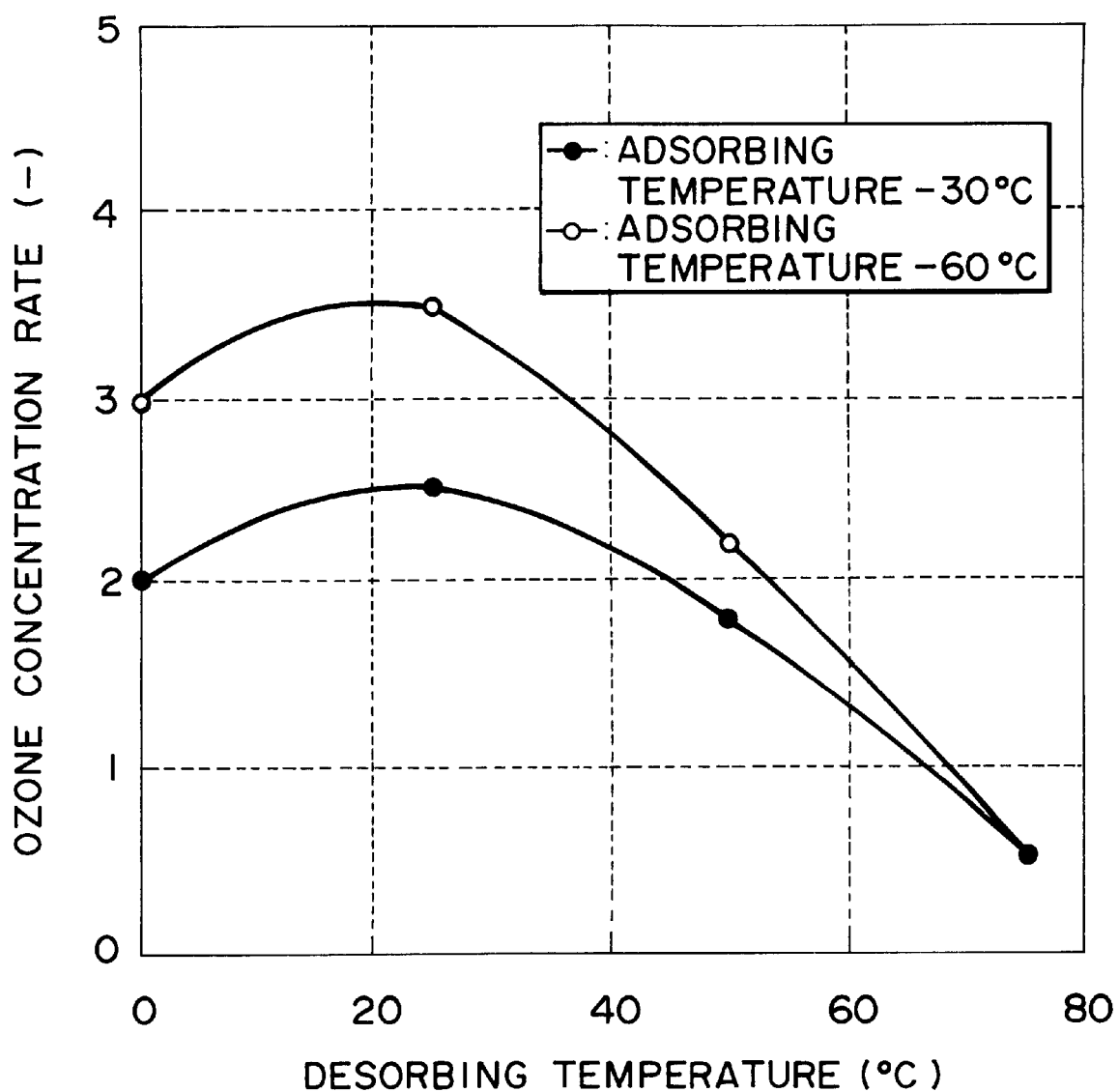
FIG. 14 is a graph showing the ozone concentration rate by changing the desorbing temperature, with the adsorbing tower of the apparatus in FIG. 8 filled with mesoporous silicate.
Figure 15:
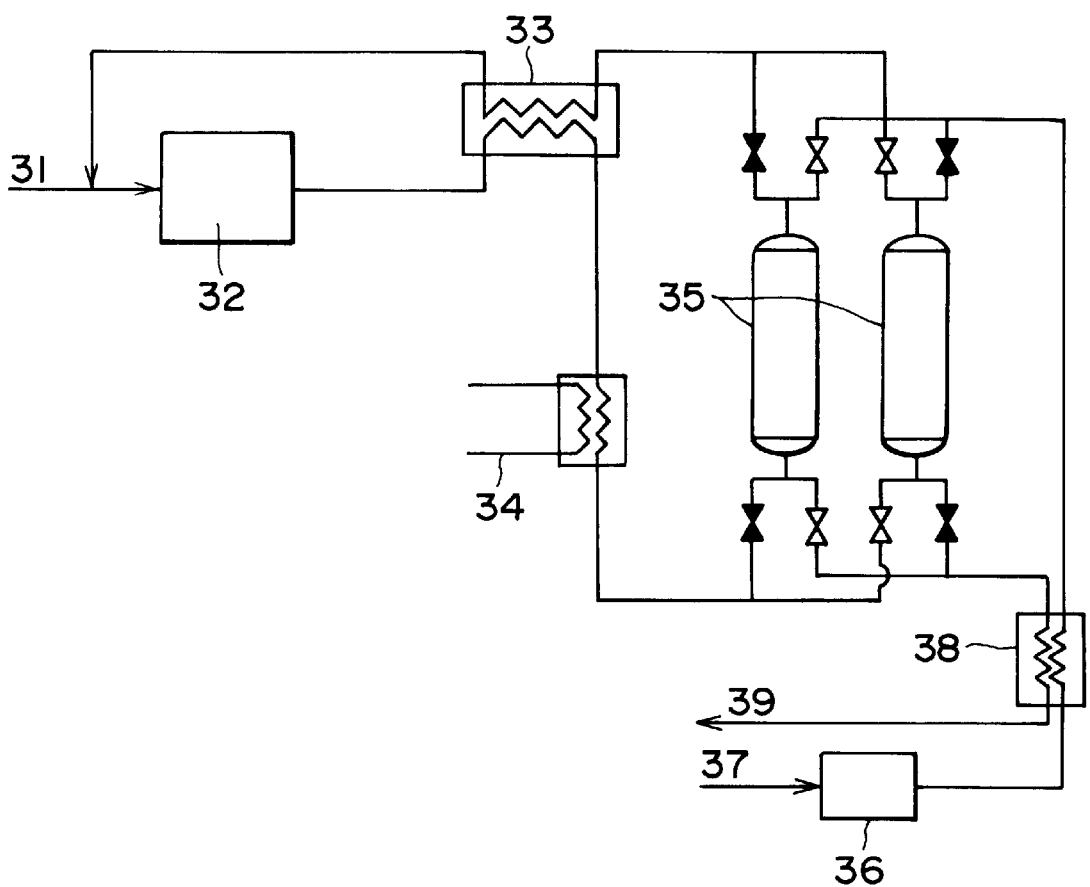
FIG. 15 is a conceptual diagram of a conventional ozone concentrating apparatus.

As clear from FIG. 14, at the desorbing temperature of 75° C., there was almost no difference in the ozone concentration rate between the adsorbing temperature of −60° C. and −30° C., and the ozone concentration reaches its peak at the desorbing temperature of around 20° C., and at the desorbing temperature of 0° C., the ozone concentration rate was 3 and 2 at the adsorbing temperature of −60° C. and −30° C., respectively. As the temperature became lower, the difference in the ozone concentration rate began to increase, and at the desorbing temperature of 0° C., the ozone concentration rate was 3 and 2 due to difference in the adsorbing temperature.

What is claimed is:

1. A manufacturing method for producing high concentration ozone gas, employing a pressure swing adsorbing apparatus for performing an adsorbing process and a desorbing process having a plurality of adsorbing layers filled with an ozone adsorbent, comprising the steps of: feeding gas containing ozone at: a relatively high pressure into the adsorbing layers for performing the adsorbing process, and recovering concentrated ozone gas by setting the adsorbing layers of the desorbing process to a relatively low pressure, wherein the ozone adsorbent is selected from the group consisting of high silica pentasyl zeolite, dealuminized fogersite, and mesoporous silicate, wherein the adsorbing layers in the adsorbing process are held at a temperature between −60° C. to 25° C., and wherein the adsorbing pressure in the adsorbing process is held at a pressure between 1.05 to 5 atm, and wherein the desorbing pressure of the desorbing process is selected in a range of 0.04 to 0.3 atm, and wherein the high silica pentasyl zeolite has a $SiO_2/Al_2O_3$ ratio of 70 or more, dealuminized fogersite has a $SiO_2/Al_2O_3$ ratio of 20 or more, and mesoporous silicate has a $SiO_2/Al_2O_3$ ratio of 20 or more.

2. A method of producing high concentration ozone gas according to claim 1, wherein ozone is generated by using a water electrolytic ozone generating apparatus of high pressure, the gas containing ozone is fed into the adsorbing layers in the adsorbing process of the pressure swing adsorbing apparatus, and part of the oxygen concentrated gas flowing out from the adsorbing layers in the adsorbing process is returned to the hydrogen electrode chamber of the water electrolytic ozone generating apparatus to depolarize the oxygen.

3. A method of producing high concentration ozone gas according to claim 1, wherein ozone is generated by using a silent discharge ozone generating apparatus of high pressure, the gas containing ozone is fed into the adsorbing layers in the adsorbing process of the pressure swing adsorbing apparatus, and part of the high pressure oxygen concentrated gas flowing out from the adsorbing layers in the adsorbing process is returned to the material side of the silent discharge ozone generating apparatus.

4. A method of producing high concentration ozone gas according to claim 1, wherein the changeover time of the pressure swing adsorbing apparatus is selected in a range of 1 to 10 minutes.

5. A method of producing high concentration ozone gas according to claim 1, wherein part of the high pressure oxygen concentrated gas flowing out from the adsorbing layers in the adsorbing process is decompressed by a reducing valve, and is fed into the adsorbing layers in the desorbing process to be purged.

6. A method of producing high concentration ozone gas according to claim 5, wherein the purge rate in the purge operation is selected in a range of 1 to 2.

7. A method for producing high concentration ozone gas according to claim 1, wherein the adsorbing pressure in the adsorbing process is held at a pressure between 1.05 to 5 atm, and wherein the desorbing pressure of the desorbing process is selected in a range of 0.04 to 0.3 atm.

8. A method of producing high concentration ozone gas according to claim 1, wherein the changeover time of the pressure swing adsorbing apparatus is selected in a range of 1 to 10 minutes.

9. A method of producing high concentration ozone gas according to claim 1, wherein part of the high pressure oxygen concentrated gas flowing out from the adsorbing layers in the adsorbing process is decompressed by a reducing valve, and is fed into the adsorbing layers in the 5 desorbing process to be purged.

10. A method of producing high concentration ozone gas according to claim 9, wherein the purge rate in the purge operation is selected in a range of 1 to 2.

11. A method of producing high concentration ozone gas according to claim 1, wherein ozone is generated by using a water electrolytic ozone generating apparatus of high pressure, the gas containing ozone is fed into the adsorbing layers in the adsorbing process of the pressure swing adsorbing apparatus, and part of the oxygen concentrated gas flowing out from the adsorbing layers in the adsorbing process is returned to the hydrogen electrode chamber of the water electrolytic ozone generating apparatus to depolarize the oxygen.

12. A method of producing high concentration ozone gas according to claim 1, wherein ozone is generated by using a silent discharge ozone generating apparatus of high pressure, the gas containing ozone is fed into the adsorbing layers in the adsorbing process of the pressure swing adsorbing apparatus, and part of the high pressure oxygen concentrated gas flowing out from the adsorbing layers in the adsorbing process is returned to the material side of the silent discharge ozone generating apparatus.

13. A method for producing high concentration ozone gas, using two or more adsorbing layers filled with ozone adsorbent, employing a temperature swing adsorbing system for transferring the adsorbing layers from an adsorbing process at a relatively low temperature to a desorbing process, at a relatively high temperature, and further returning to the adsorbing process, precooling the gas containing ozone from an ozone generating apparatus and feeding into the adsorbing layers in the adsorbing process, discharging oxygen concentrated gas at a relatively low temperature from the adsorbing layers, passing purge gas at a relatively high temperature into the adsorbing layers in the desorbing process in an opposite direction of the gas flow in the adsorbing process, and recovering the concentrated ozone gas continuously, wherein the ozone adsorbent is one or two or more kinds of adsorbent selected from the group consisting of high silica pentasyl zeolite, dealuminized fogersite, and mesoporous silicate, and the gas containing ozone from the ozone generating apparatus is cooled by the oxygen, wherein the adsorbing temperature of the adsorbing process is selected in a range of $-100°$ C. to $-30°$ C., and the desorbing temperature of the desorbing process is selected in a range of $0°$ C. to $50°$ C.

14. A for producing high concentration ozone gas according to claim 13, wherein purge gas suited to the purpose of use of the high concentration ozone gas is heated to purge temperature, and is passed into the adsorbing layers in the desorbing process in an opposite direction of the gas flow in the adsorbing process, and the ozone is heated, purged and desorbed.

15. A method for producing high concentration ozone gas according to claim 13, wherein the purge rate in the purge operation is selected in a range of 1 to 2.

16. A method for producing high concentration ozone gas according to claim 13, using three or more adsorbing layers and employing a temperature swing adsorbing system for transferring the adsorbing layers from an adsorbing process at a relatively low temperature to a desorbing process at a relatively high temperature, and further returning to the adsorbing process through a cooling process, wherein part of oxygen concentrated gas at a relatively low temperature flowing out from the adsorbing process is fed into the adsorbing layers in the cooling process and is cooled.

17. A method for producing high concentration ozone gas according to claim 13, wherein the adsorbing pressure of the adsorbing process is selected in a range of 1 to 4 atm.

18. A method for producing high concentration ozone gas according to claim 13, wherein the changeover time of the temperature swing adsorbing system is selected in a range of 10 to 60 minutes.

19. A method for producing high concentration ozone gas according to claim 13, using a water electrolytic ozone generating apparatus as the ozone generating apparatus, wherein part of the oxygen concentrated gas flowing out from the adsorbing layers in the adsorbing process is returned to the hydrogen electrode chamber of the water electrolytic ozone generating apparatus to depolarize the oxygen.

20. A method for producing high concentration ozone gas according to claim 13, using a silent discharge ozone generating apparatus as the ozone generating apparatus, wherein part of the oxygen concentrated gas flowing out from the adsorbing layers in the adsorbing process is returned to the oxygen material side of the silent discharge ozone generating apparatus.

21. A method for producing high concentration ozone gas according to claim 13, wherein part of oxygen concentrated gas at a relatively low temperature flowing out from the adsorbing layers in the adsorbing process is heated to purge temperature, and is passed into the adsorbing layers in the desorbing process in an opposite direction of the gas flow in the adsorbing process, and the ozone is heated, purged, and desorbed.

22. A method for producing high concentration ozone gas according to claim 16, wherein part of oxygen concentrated gas at a relatively low temperature flowing out from the adsorbing layers in the adsorbing process is heated to purge temperature, and is passed into the adsorbing layers in the desorbing process in an opposite direction of the gas flow in the adsorbing process, and the ozone is heated, purged and desorbed.

23. A method for producing high concentration ozone gas according to claim 16, wherein purge gas suited to the purpose of use of the high concentration ozone gas is heated to purge temperature, and is passed into the adsorbing layers in the desorbing process in an opposite direction of the gas flow in the adsorbing process, and the ozone is heated purged and desorbed.

24. A method for producing high concentration ozone gas according to claim 16, wherein the purge rate in the purge operation is selected in a range of 1 to 2.

25. A method for producing high concentration ozone gas according to claim 16, wherein the adsorbing temperature of the adsorbing process is selected in a range of $-100°$ C. to $-30°$ C., and the desorbing temperature of the desorbing process is selected in a range of $0°$ C. to $50°$ C.

26. A method for producing high concentration ozone gas according to claim 16, wherein the adsorbing pressure of the adsorbing process is selected in a range of 1 to 4 atm.

27. A method for producing high concentration ozone gas according to claim 16, wherein the changeover time of the temperature swing adsorbing system is selected in a range of 10 to 60 minutes.

28. A method for producing high concentration ozone gas according to claim 16, using a water electrolytic ozone generating apparatus as the ozone generating apparatus, wherein part of the oxygen concentrated gas flowing out from the adsorbing layers in the adsorbing process is returned to the hydrogen electrode chamber of the water electrolytic ozone generating apparatus to depolarize the oxygen.

29. A method for producing high concentration ozone gas according to claim 16, using a silent discharge ozone generating apparatus as the ozone generating apparatus, wherein part of the oxygen concentrated gas flowing out from the adsorbing layers in the adsorbing process is returned to the oxygen material side of the silent discharge ozone generating apparatus.

* * * * *